United States Patent
Joo et al.

(10) Patent No.: US 10,450,674 B2
(45) Date of Patent: Oct. 22, 2019

(54) PROCESS FOR PREPARING A SILICON-CARBON NANOCOMPOSITE NANOFIBER

(71) Applicant: CORNELL UNIVERSITY, Ithaca, NY (US)

(72) Inventors: Yong Lak Joo, Ithaca, NY (US); Kyoung Woo Kim, Ithaca, NY (US); Yong Seok Kim, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 15/463,226

(22) Filed: Mar. 20, 2017

(65) Prior Publication Data

US 2017/0191193 A1 Jul. 6, 2017

Related U.S. Application Data

(63) Continuation of application No. 14/457,994, filed on Aug. 12, 2014, now abandoned, which is a
(Continued)

(51) Int. Cl.
| | | |
|---|---|---|
| *D01D 5/00* | (2006.01) |
| *D01F 9/20* | (2006.01) |
| *D01F 9/12* | (2006.01) |
| *D01D 1/02* | (2006.01) |
| *D01F 1/02* | (2006.01) |

(Continued)

(52) U.S. Cl.
CPC ............. *D01D 5/0015* (2013.01); *D01D 1/02* (2013.01); *D01D 5/003* (2013.01); *D01F 1/02* (2013.01); *D01F 9/12* (2013.01); *D01F 9/20* (2013.01); *H01M 4/587* (2013.01); *D01D 5/0069* (2013.01); *D01F 9/328* (2013.01); *D04H 1/728* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 8,283,091 B2 | 10/2012 | Lee et al. | |
| 8,519,045 B2 * | 8/2013 | Jang | B82Y 30/00 524/496 |

(Continued)

FOREIGN PATENT DOCUMENTS

| | | |
|---|---|---|
| KR | 20100112378 A | 10/2010 |
| WO | 2011068389 A2 | 6/2011 |
| WO | 2013130712 A1 | 6/2013 |

OTHER PUBLICATIONS

Zhang, Mei, and Jian Li. "Carbon nanotube in different shapes." Materials today 12.6 (Jun. 2009): 12-18. (Year: 2009).*

(Continued)

*Primary Examiner* — Benjamin A Schiffman
(74) *Attorney, Agent, or Firm* — Bond, Schoeneck & King, PLLC; Blaine Bettinger; William Greener

(57) ABSTRACT

Provided herein are nanofibers comprising carbon precursors, nanofibers comprising carbon matrices, and processes for preparing the same. In specific examples, provided herein are high performance lithium ion battery anodic nanofibers comprising non-aggregated silicon domains in a continuous carbon matrix.

8 Claims, 7 Drawing Sheets

Related U.S. Application Data continuation of application No. PCT/US2014/025974, filed on Mar. 13, 2014.

(60) Provisional application No. 61/894,054, filed on Oct. 22, 2013, provisional application No. 61/791,619, filed on Mar. 15, 2013, provisional application No. 61/781,260, filed on Mar. 14, 2013.

(51) Int. Cl.

| | |
|---|---|
| H01M 4/587 | (2010.01) |
| D01F 9/32 | (2006.01) |
| D04H 1/728 | (2012.01) |
| H01M 10/0525 | (2010.01) |

(56) References Cited

U.S. PATENT DOCUMENTS

| | | |
|---|---|---|
| 2008/0274403 A1 | 6/2008 | Kim et al. |
| 2008/0176139 A1 | 7/2008 | White et al. |
| 2010/0200874 A1 | 8/2010 | Shioi et al. |
| 2010/0233523 A1 | 9/2010 | Jo et al. |
| 2011/0200874 A1 | 8/2011 | Ono et al. |
| 2012/0034512 A1 | 9/2012 | Zhang et al. |

OTHER PUBLICATIONS

Matsumoto, Hidetoshi, et al. "Electrospun composite nanofiber yarns containing oriented graphene nanoribbons." ACS applied materials & interfaces 5.13 (Jun. 26, 2013): 6225-6231. (Year: 2013).*

Wan, Chaoying, and Biqiong Chen. "Poly (ε-caprolactone)/graphene oxide biocomposites: mechanical properties and bioactivity." Biomedical Materials 6.5 (Sep. 16, 2011): 055010. (Year: 2011).*

Pant, Hem Raj, et al. "Bimodal fiber diameter distributed graphene oxide/nylon-6 composite nanofibrous mats via electrospinning." Colloids and Surfaces A: Physicochemical and Engineering Aspects 407 (May 25, 2012): 121-125. (Year: 2012).*

Bao, Qiaoliang, et al. "Graphene-polymer nanofiber membrane for ultrafast photonics." Advanced functional materials 20.5 (Feb. 26, 2010): 782-791. (Year: 2010).*

Alvarez et al., "Conductive-Probe Atomic Force Microscopy Characterization of Silicon Nanowire", 2011, Nanoscale Research Letters, 6:110, pp. 1-9.

Chakrapani, V., et al. "Quaternary Ammonium Ionic Liquid Electrolyte for a Silicon Nanowire-Based Lithium Ion Battery", 2011, American Chemical Society, vol. 115 pp. 22048-22053.

Chan, C.K., et al., "High-Performance Lithium Battery Anodes Using Silicon Nanowires", 2008 Nature Publishing Group, Nature Nanotechnology, vol. 3, pp. 31-35.

Chan, C.K., et al, "Structural and Electrochemical Study of the Reaction of Lithium with Silicon Nanowires", 2009, Journal of Power Sources, vol. 189, pp. 34-39.

Choi, J.W., et al., "Metal Current Collector-Free Freestanding Silicon-Carbon 1D Nanocomposites for Ultralight Anodes in Lithium Ion Batteries", 2010, Journal of Power Sources, pp. 1-20.

Choi, N.S., et al., "One Dimensional Si/Sn-Based Nanowires and Nanotubes for Lithium-Ion Energy Storage Materials", 2011, The Royal Society of Chemistry, DOI: 10.1039/c0jm03842c.

Choi, J.W., et al., "Silicon Nanofi brils on a Flexible Current Collector for Bendable Lithium-Ion Battery Anodes", 2012 Wiley-VCH Verlag GmbH & Co. KGaA, Weinheim, wileyonlinelibrary.com, DOI: 10.1002/adfm.201202458.

Cui, L.F., et al., "Crystalline-Amorphous Core#Shell Silicon Nanowires for High Capacity and High Current Battery Electrodes", Jan. 13, 2009, Nano Letters is published by the American Chemical Society. 1155 Sixteenth Street N.W., Washington, DC 20036, DOI: 10.1021/nl8036323.

Cui, Y., et al., "Diameter-Controlled Synthesis of Single-Crystal Silicon Nanowires", Apr. 9, 2001, Applied Physics Letters, vol. 78, No. 15, pp. 2214-2216.

Cui, Y. and Lieber, C, "Functional Nanoscale Electronic Devices Assembled Using Silicon Nanowire Building Blocks", Feb. 2, 2001, Science, vol. 291, pp. 851-853.

Cui, L.F., "Light-Weight Free-Standing Carbon Nanotube-Silicon Films for Anodes of Lithium Ion Batteries", 2010, ACS Nano, vol. 4, No. 7, pp. 3671-3678.

Etacheri, V., et al., "Effect of Fluoroethylene Carbonate (FEC) on the Performance and Surface Chemistry of Si-Nanowire Li-Ion Battery Anodes", 2012, Langmuir 2012, vol. 28, pp. 965-976.

Garnett, E., and Yang, P., "Light Trapping in Silicon Nanowire Solar Cells", Department of Chemistry, University of California, Berkeley, California 94720, 2010, Nano Letters, vol. 10, pp. 1082-1087.

Henderson, E.J., et al., "Influence of HSiO1.5 Sol-Gel Polymer Structure and Composition on the Size and Luminescent Properties of Silicon Nanocrystals", 2009, Chemistry of Materials, Article 21, pp. 5426-5434.

Hu, L., et al., "Printed Energy Storage Devices by Integration of Electrodes and Separators Into Single Sheets of Paper", 2010, Applied Physics Letters, No. 96, pp. 183502-1-183502-2.

Hu, L., et al., "Si Nanoparticle-Decorated Si Nanowire Networks for Li-Ion Battery Anodes", 2010, Department of Materials Science and Engineering, Stanford University, Stanford, California 94305, Journal The Royal Society of Chemistry, DOI: 10.1039/c0cc02078h.

Hwang, T. H., et al., "Electrospun Core-Shell Fibers for Robust Silicon Nanoparticle-Based Lithium Ion Battery Anodes", 2012, Nano Letters, vol. 12, pp. 802-807.

Inagaki, M., et al., "Carbon Materials for Electrochemical Capacitors", 2010, Journal of Power Sources, vol. 195, pp. 7880-7903.

Kaempgen, M., et al., "Printable Thin Film Supercapacitors Using Single-Walled Carbon Nanotubes", 2009, Nano Letters, vol. 9, No. 5, pp. 1872-1876.

Kim, S. L., et al, "Rutile TiO2-Modified Multi-Wall Carbon Nanotubes in TiO2 Film Electrodes for Dye-Sensitized Solar Cells", 2006, Journal of Applied Electrochemistry, vol. 36, pp. 1433-1439.

Kushnir, D. and Sandén, B. A., "Multi-level Energy Analysis of Emerging Technologies: A Case Study in New Materials for Lithium Ion Batteries", 2011, Journal of Cleaner Production, vol. 19, pp. 1405-1416.

Lee, J. Y., et al., "Solution-Processed Metal Nanowire Mesh Transparent Electrodes", 2008, Nano Letters, vol. 8, No. 2, pp. 689-692.

Li, D. and Xia, Y., "Electrospinning of Nanofibers: Reinventing the Wheel?", 2004, Advanced Materials, vol. 16, No. 14, pp. 1151-1170.

Li, D., et al., "Thermal Conductivity of Individual Silicon Nanowires", 2003, Applied Physics Letters, vol. 83, No. 14, pp. 2934-2936.

Liu, X., et al., "Manipulation of Phase and Microstructure at Nanoscale for SiC in Molten Salt Synthesis", 2013, Chemistry of Material, Article 25, pp. 2021-2027.

Liu, N., et al., "Prelithiated Silicon Nanowires as an Anode for Lithium Ion Batteries", Department of Chemistry and Department of Materials Science and Engineering, Stanford University, Stanford, California 94305, 2011, ACS Nano, Published online vol. 10.1021/nn2017167.

Magasinski, A., et al., "High-Performance Lithium-Ion Anodes Using a Hierarchical Bottom-Up Approach", 2010, Nature Materials, Article, vol. 9, pp. 353-359.

Mohan, D., et al., "Pyrolysis of Wood/Biomass for Bio-Oil: A Critical Review", 2006, Energy & Fuels, vol. 20, No. 3, pp. 848-889.

Park, J., et al., "One-Pot Synthesis of Silicon Nanoparticles Trapped in Ordered Mesoporous Carbon for Use as an Anode Material in Lithium-Ion Batteries", 2013, IOPscience.iop.org, IOP Publishing Ltd, Nanotechnology Article 24, 025602, pp. 1-7.

Park, M. H., et al., "Silicon Nanotube Battery Anodes", 2009, Nano Letters, vol. 9, No. 11, pp. 3844-3847.

Patil Al., et al., "Issue and Challenges Facing Rechargeable Thin Film Lithium Batteries", 2008, Thin Film Materials Research Center, Korea Institute of Science and Technology, Seoul 136-791, Republic of Korea, Science Direct, Materials Research Bulletin, vol. 43, pp. 1913-1942.

(56) References Cited

OTHER PUBLICATIONS

Ruffo, R., et al. "Impedance Analysis of Silicon Nanowire Lithium Ion Battery Anodes", 2009, J. Phys. Chem. C, vol. 113, No. 26, pp. 11390-11398.

Scrosati, B., "Recent Advances in Lithium Ion Battery Materials", 2000, Elsevier Science Ltd., Electrochimica Acta, vol. 45 pp. 2461-2466.

Scrosati, B. and Garche, J., "Lithium Batteries: Status, Prospects and Future", 2010, Journal of Power Sources, vol. 195, pp. 2419-2430.

Song, T., et al., "Arrays of Sealed Silicon Nanotubes as Anodes for Lithium Ion Batteries", 2010, Nano Letters, vol. 10, pp. 1710-1716.

Wu, H., et al., "Engineering Empty Space Between Si Nanoparticles for Lithium-Ion Battery Anodes", 2012, Nano Letters, vol. 12, pp. 904-909.

Wu, H., et al., "Stable Cycling of Double-Walled Silicon Nanotube Battery Anodes Through Solid-Electrolyte Interphase Control", May 2012, Nature Nanotechnology, vol. 7, pp. 310-315.

Yang, Y., et al., "New Nanostructured Li2S/Silicon Rechargeable Battery with High Specific Energy", 2010, Nano Letters, vol. 10, pp. 1486-1491.

Yao, Y., et al., "Interconnected Silicon Hollow Nanospheres for Lithium-Ion Battery Anodes with Long Cycle Life", 2011, Nano Letters, dx.doi.org/10.1021/nl201470j.

Yu, G., et al., "Solution-Processed Graphene/MnO2 Nanostructured Textiles for High-Performance Electrochemical Capacitors", 2011, Nano Letters, vol. 11, pp. 2905-2911.

Zhang, Q., et al., "Anisotropic Lithium Insertion Behavior in Silicon Nanowires: Binding Energy, Diffusion Barrier, and Strain Effect", 2011, The Journal of Physical Chemistry, Article, pubs.acs.org/JPCC, dx.doi.org/10.1021/jp1115977.

Zhang, Q., et al., "Lithium Insertion in Silicon Nanowires: An Ab Initio Study", 2010, Nano Letters, vol. 10, pp. 3243-3249.

Zhang, D., et al., "Silicon Carbide Nanosprings", 2003, Nano Letters, vol. 3, No. 7, pp. 983-987.

Zheng, G., et al., "Hollow Carbon Nanofiber-Encapsulated Sulfur Cathodes for High Specific Capacity Rechargeable Lithium Batteries", 2011, Nano Letters, vol. 11, pp. 4462-4467.

Zhu, J., et al., "Amorphous Silicon Core-Shell Nanowire Solar Cells", Department of Electrical Engineering, Stanford University, Stanford, CA 94305; 2 Nation Renewable Energy Laboratory, Golden, CO 80401; 3 Department of Materials Science and Engineering, Stanford University, Stanford, CA 94305.

International Search Report Form PCT/ISA/220, International Application No. PCT/US2013/028165, pp. 1-13, dated Jun. 21, 2013.

International Search Report Form PCT/ISA/220, International Application No. PCT/US2013/028132, pp. 1-13, dated Jun. 21, 2013.

Jeong, J. S., et al. "Mechanical properties of electrospun PVA/MWNTs composite nanofibers." Thin Solid Films 515.12 (Apr. 23, 2007): 5136-5141.

Kong, Hai-Yan, and Ji-Huan He. "Superthin combined PVA-graphene film." Thermal Science 16.5 (Dec. 2012): 1560-1561.

Ji, Liwen, and Xiangwu Zhang. "Electrospun carbon nanofibers containing silicon particles as an energy-storage medium." Carbon 47.14 (Nov. 2009): 3219-3226.

Wong, Kenneth Kar Ho, et al. "The effect of carbon nanotube aspect ratio and loading on the elastic modulus of electrospun poly (vinyl alcohol)-carbon nanotube hybrid fibers." Carbon 47.11 (Sep. 2009): 2571-2578.

Fan, Xing, et al. "Electrospinning preparation of nanosilicon/disordered carbon composite as anode materials in Li-ion battery." Electrochemical and Solid-State Letters 12.10 (Jul. 29, 2009): A199-A201.

Zhmayev, Eduard, Daehwan Cho, and Yong Lak Joo. "Nanofibers from gas-assisted polymer melt electrospinning." Polymer 51.18 (Aug. 19, 2010): 4140-4144.

Bianco, Alberto, et al., all in the graphene family—A recommended nomenclature for two-dimensional carbon materials; copyright 2013 Elsevier Ltd., www.elsevier.com/locate/carbon; Carbon 65 (2013) pp. 1-6.

\* cited by examiner

PROCESS FOR PREPARING A SILICON-CARBON NANOCOMPOSITE NANOFIBER

CROSS-REFERENCE

This application is a continuation of U.S. application Ser. No. 14/457,994 filed Aug. 12, 2014, which itself is a US Bypass continuation (CON) application under 35 USC 111 (a) and claims the benefit of co-pending International Application No. PCT/US14/25974 filed Mar. 13, 2014, which itself claims the benefit of U.S. Provisional Application Nos. 61/781,260 filed Mar. 14, 2013, 61/791,619 filed Mar. 15, 2013, and 61/894,054 filed on Oct. 22, 2013, which are all incorporated herein by reference in their entireties.

BACKGROUND OF THE INVENTION

Batteries comprise one or more electrochemical cell, such cells generally comprising a cathode, an anode and an electrolyte. Lithium ion batteries are high energy density batteries that are fairly commonly used in consumer electronics and electric vehicles. In lithium ion batteries, lithium ions generally move from the negative electrode to the positive electrode during discharge and vice versa when charging. In the as-fabricated and discharged state, lithium ion batteries often comprise a lithium compound (such as a lithium metal oxide) at the cathode (positive electrode) and another material, generally carbon, at the anode (negative electrode).

SUMMARY OF THE INVENTION

Provided herein is a carbon nanomaterials platform. In specific instances, such carbon nanomaterials are carbon-silicon nanocomposites comprising a carbon matrix material (e.g., continuous carbon matrix), with silicon domains (e.g., nanoparticles) embedded therein (e.g., a carbon-silicon composite). In some embodiments, provided herein are processes for preparing the same. In specific embodiments, the processes described herein provide improved performance of the materials—e.g., improved continuity and/or morphology control of the carbon matrix and, thereby, improved electrochemical performance of the nanocomposite materials. Also provided herein are nanomaterials comprising polymer and nanostructured carbon (e.g., carbon allotrope) or nanostructured carbon precursor (e.g., high aspect ratio carbon or carbon precursor—such as having an aspect ratio of greater than 2, 5, 10 or the like). In specific instances, the nanomaterials comprise polymer and nanostructured carbon (e.g., carbon allotrope). In further or alternative specific instances, the nanomaterials comprise polymer and nanostructured carbon precursor (e.g., cellulose nanocrystals). In certain instances, such nanomaterials (comprising polymer, and carbon precursor or carbon nanostructure, and optional silicon domains (e.g., nanoparticles)) are precursor materials for (i.e., can be converted—e.g., through thermal and/or chemical treatment) the carbon nanomaterials provided herein.

In certain embodiments, provided herein is a process for preparing a nanofiber (e.g., the nanofiber comprising a polymer or carbon matrix (e.g., a continuous carbon matrix)), the process comprising:

providing a fluid stock comprising (i) a polymer and (ii) carbon (e.g., carbon allotrope, such as CNT) or a carbon precursor (e.g., wherein the carbon and/or carbon precursor is high aspect ratio, nanostructured carbon and/or carbon precursor); and electrospinning the fluid stock (e.g., producing a nanofiber comprising a polymer matrix with carbon and/or carbon precursor nanostructures (e.g., high aspect ratio) embedded therein).

In more specific embodiments, provided herein is a process for preparing a nanofiber, the nanofiber comprising a carbon matrix (e.g., continuous carbon matrix), the process comprising:

providing a fluid stock comprising (i) a polymer and (ii) carbon (e.g., a carbon allotrope) or a carbon precursor (e.g., wherein the carbon and/or carbon precursor is high aspect ratio, nanostructured carbon and/or carbon precursor);

electrospinning the fluid stock, producing a first (e.g., as-spun) nanofiber; and thermally treating the first (e.g., as-spun, including non- and pre-treated) nanofiber (e.g., under inert or reducing conditions), producing a second nanofiber comprising a continuous carbon matrix.

In still more specific embodiments, provided herein is a process for preparing a nanofiber, the nanofiber comprising a carbon matrix (e.g., continuous carbon matrix), the process comprising:

providing a fluid stock comprising (i) a polymer, (ii) carbon (e.g., such as a carbon allotrope) or a carbon precursor (e.g., wherein the carbon and/or carbon precursor is high aspect ratio, nanostructured carbon and/or carbon precursor), and (iii) a metal component (e.g., a metal precursor or metal-containing nanoparticle);

electrospinning the fluid stock, producing a first (e.g., as-spun nanofiber); and thermally treating the first (e.g., as-spun) nanofiber (e.g., under inert or reducing conditions), producing a second nanofiber comprising a continuous carbon matrix (e.g., and metal component embedded therein).

In further or alternative specific embodiments, provided herein is a process for preparing a nanofiber, the nanofiber comprising a carbon composite, the process comprising:

providing a fluid stock comprising (i) a polymer, (ii) carbon (e.g., such as a carbon allotrope) or a carbon precursor (e.g., wherein the carbon and/or carbon precursor is high aspect ratio, nanostructured carbon and/or carbon precursor), and (iii) a metal component (e.g., a metal precursor or metal-containing nanoparticle);

electrospinning the fluid stock, producing first (e.g., as-spun) nanofiber; and thermally treating the first (e.g., as-spun) nanofiber (e.g., under inert or reducing conditions), producing a second nanofiber, the second nanofiber being a carbon composite nanofiber (e.g., comprising carbon, such as a continuous matrix of carbon, and metal or metal oxide, such as nanoparticles or other nanostructures thereof).

In still further or alternative specific embodiments, provided herein is a process for preparing a composite nanofiber, the process comprising:

providing a fluid stock comprising (i) a polymer, and (ii) a high aspect ratio nanostructure (e.g., carbon (e.g., carbon allotrope, such as CNT or graphene) or carbon precursor (e.g., CNC);

electrospinning the fluid stock, producing first (e.g., as-spun) nanofiber (e.g., comprising a polymer/nanostructure composite material); and optionally thermally treating the first (e.g., as-spun) nanofiber (e.g., under inert or reducing conditions), producing a second nanofiber (e.g., comprising a carbon/nanostructure composite material).

In some embodiments, thermal treatment is optional or omitted—e.g., to prepare a precursor nanofiber for a lithium ion battery anode material (nanomaterial).

Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, polyvinylidene difluoride (PVDF), hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like. In other instances, e.g., wherein silicon nanoparticles are utilized as the silicon component, other polymers, such as polyacrylonitrile ("PAN") are optionally utilized (e.g., with DMF as a solvent). In other instances, a polyacrylate (e.g., polyalkacrylate, polyacrylic acid, polyalkylalkacrylate, or the like) is optionally utilized.

In certain embodiments, the carbon precursor is an organic nanomaterial (e.g., an organic crystalline nanomaterial). Carbon precursors include any suitable material that may be converted to carbon, such as abundant natural organic materials, e.g., cellulose, lignin, collagen, polysaccharide (e.g., maltodextrin), keratin, protein, polymer (e.g., a second polymer, such as a polymer that does not dissolve in the fluid stock medium), bamboo fiber, or the like. In some embodiments, such carbon precursors are nanostructured (e.g., high aspect ratio, nanostructured) materials. In specific embodiments, the carbon precursor is cellulosic nanomaterial, such as nanocrystalline cellulose (CNC—cellulose nanocrystals). In other embodiments, the carbon is a non-organic carbon (e.g., a carbon allotrope) nanomaterial—e.g., amorphous carbon, carbon nanotubes (CNT), graphene, graphite, or the like. In certain embodiments, the carbon and/or carbon precursor is nanostructured—e.g., having at least one dimension (e.g., diameter) that is about 2000 microns or less, e.g., about 1000 microns or less. In certain embodiments, such nanostructures are high aspect ratio, e.g., wherein the nanostructures have a second dimension (e.g., length) that is at least 2×, 5×, or 10× the first dimension. In some embodiments, the (nanostructured) carbon and/or carbon precursor is a nanomaterial having an aspect ratio of at least 5. In more specific embodiments, the carbon and/or carbon precursor is a nanomaterial having an aspect ratio of at least 10. In certain instances, electrospinning of a fluid stock comprising carbon and/or carbon precursors with a larger aspect ratio provides nanofibers comprising such precursors aligned lengthwise with the nanofiber. In some instances, thermal treatment of such materials provides nanofiber having improved morphology of the continuous carbon matrix and/or improved performance (e.g., electrochemical performance, for example, as an anode material in a lithium ion battery). In certain embodiments, the as-spun nanofibers are optionally treated prior to thermal treatment—e.g., washing with solvent or chemical reagent—such pre-treated nanofibers are considered as-spun nanofibers (e.g., pre-treated as-spun nanofibers) for the purposes of the disclosure herein.

In some embodiments, the metal component is a silicon containing nanoparticle (e.g., comprising zero oxidation state silicon). In other embodiments, the metal component is a silicon precursor, such as silicon acetate. In other embodiments, the metal component is a nanoparticle or precursor (e.g., alkoxide, halide or acetate salt) of a lithium ion battery anode material (e.g., tin, tin oxide, titanium dioxide, aluminum, or the like). In still other embodiments, the metal component is a germanium containing nanoparticle (e.g., comprising zero oxidation state germanium).

In certain embodiments, the fluid stock is aqueous. In specific embodiments, the fluid stock is aqueous and comprises PVA. In some embodiments, the fluid stock comprises an organic solvent. In specific embodiments, the organic solvent is dimethylformamide (DMF). In specific embodiments, the fluid stock comprises DMF as a solvent and PAN as a polymer.

In some embodiments, the process comprises electrospinning the fluid stock with gas assistance. In specific embodiments, the process comprises electrospinning the fluid stock with coaxial gas assistance. In some embodiments, the gas assistances is provided by blowing gas (e.g., high velocity gas) along or around (i.e., coaxially) a longitudinal axis along which the fluid stock is provided (e.g., along a common axis with which the fluid stock is electrospun). In some embodiments, coaxial gas assistance comprises providing a gas (e.g., pressurized or high velocity gas) centered around the same longitudinal axis as the fluid stock is provided and centered. FIG. 3 illustrates an exemplary nozzle for providing coaxial-gas assisted electrospinning a fluid stock: the fluid stock is electrospun along a longitudinal axis and providing the gas around the same longitudinal axis. In other embodiments, coaxial gas assistance comprises providing a gas (e.g., pressurized or high velocity gas) around or along (but not necessarily centered around) the longitudinal axis the fluid stock is provided and centered. In some instances, coaxial gas assistance comprises providing a gas (e.g., pressurized or high velocity gas) centered around a different longitudinal axis as the fluid stock is provided and centered. In some instances, coaxial gas assisted electrospinning provided herein comprises providing a fluid stock along a first longitudinal axis, providing a gas (e.g., pressurized or high velocity gas) around a second longitudinal axis, and electrospinning the fluid stock. In specific embodiments, the first and second longitudinal axes are the same. In other embodiments, the first and second longitudinal axes are different. In certain embodiments, the first and second longitudinal axes are within 500 microns, within 100 microns, within 50 microns, or the like of each other. In some embodiments, the first and second longitudinal axes are aligned within 15 degrees, within 10 degrees, within 5 degrees, within 3 degrees, within 1 degree, or the like of each other. In some embodiments, the fluid stock is electrospun with a high velocity gas flowing adjacent to and about or along the same axis as the electrospun fluid stock (e.g., within 1, 5 or 10 degrees of the axis along which the fluid stock is electrospun). FIG. 1 and FIG. 3 illustrate exemplary systems for providing coaxial gas assisted electrospinning of a fluid stock.

In some instances, e.g., wherein the metal component is a silicon (or germanium) nanoparticle, such nanomaterials are suitable for providing improved (e.g., silicon containing) electrodes (e.g., for use in batteries, such as anode in lithium ion batteries). For example, in some instances, provided herein are nanofibers comprising metal component (e.g., silicon) distributed along the length of a nanofiber (e.g., in a non-aggregated manner), which, in some instances, facilitates high metal component (e.g., silicon) loading, and improved lithium ion uptake in the nanofiber/electrode (e.g., with little to no pulverization of the material). Provided herein are silicon nanofibers (including treated and as-spun nanofibers), fluid stocks (e.g., for preparing such nanofibers), and processes for preparing silicon nanofibers (including treated and as-spun nanofibers).

In some embodiments, provided herein is a process for preparing a nanofiber (e.g., the nanofiber comprising a polymer or carbon matrix (e.g., a continuous carbon matrix) with silicon nanoparticles embedded therein), the process comprising:

providing a fluid stock comprising (i) a polymer, (ii) carbon (e.g., a nanostructured carbon allotrope) and/or a carbon precursor (e.g., nanostructured cellulose), and (iii) a plurality of silicon nanoparticles;

electrospinning the fluid stock, producing a first (e.g., as-spun) nanofiber (e.g., comprising a continuous matrix of (i) polymer, (ii) carbon and/or carbon precursor, and (iii) silicon nanoparticles).

In specific embodiments, the continuous matrix of polymer comprises the silicon nanoparticles embedded therein (e.g., completely embedded therein). In more specific embodiments, the continuous matrix of polymer comprises the silicon nanoparticles and the carbon and/or carbon precursor (e.g., nanostructured cellulose and/or a nanostructured carbon allotrope) embedded therein. In certain embodiments, such nanofibers are a precursor material, which is thermally treated to prepare nanofibers comprising a continuous carbon matrix—e.g., with silicon nanoparticles embedded therein (e.g., completely embedded therein, such as wherein the surface of the silicon nanoparticles are completely covered with carbon). In some instances, such materials are suitable for use as high performance anode materials in lithium ion batteries.

In some embodiments, provided herein is a process for preparing a nanofiber (e.g., the nanofiber comprising silicon nanoparticles embedded in a polymer or carbon matrix), the process comprising:

providing a fluid stock comprising (i) a polymer, (ii) carbon and/or a carbon precursor (e.g., nanostructured cellulose and/or a carbon allotrope, such as a nanostructured carbon allotrope), and (iii) a plurality of silicon nanoparticles; and electrospinning the fluid stock, producing a first (e.g., as-spun) nanofiber.

In some embodiments, provided herein is a process for preparing a nanofiber, the nanofiber comprising a continuous carbon matrix with silicon nanoparticles embedded therein, the process comprising:

providing a fluid stock comprising (i) a polymer, (ii) carbon and/or a carbon precursor (e.g., nanostructured cellulose and/or a carbon allotrope, such as a nanostructured carbon allotrope), and (iii) a plurality of silicon nanoparticles;

electrospinning the fluid stock, producing a first (e.g., as-spun) nanofiber; and thermally treating the first (e.g., as-spun) nanofiber (e.g., under inert or reducing conditions), producing a second nanofiber comprising a continuous carbon matrix with silicon nanoparticles embedded therein.

In specific embodiments, nanofibers provided herein comprise a carbon backbone (e.g., continuous matrix material), the carbon backbone comprising nanoparticles embedded therein. In more specific embodiments, the nanoparticles comprising silicon. In some embodiments, the backbone is a core matrix material. In other embodiments, the backbone comprises a hollow core—e.g., along at least a portion of the nanofiber (e.g., with the nanoparticles embedded within the matrix material rather than found within the "hollow" center, such as illustrated in FIG. 2A).

In some embodiments, the backbone or matrix material of a nanofiber described herein comprises amorphous carbon. In certain embodiments, the backbone or matrix material of a nanofiber described herein comprises crystalline carbon (e.g., graphite and/or graphene). In further embodiments, the backbone or matrix material of a nanofiber described herein comprises amorphous carbon and crystalline carbon (e.g., wherein amorphous carbon arises from carbonization of polymer and the carbon allotrope inclusion retains its structure, or at least partially retains its structure).

In certain embodiments, the nanoparticles or discrete domains of a nanofiber provided herein comprise silicon in a zero oxidation state. In further embodiments, the nanoparticles or discrete domains of a nanofiber provided herein comprise silicon in a zero oxidation state (e.g., elemental silicon) and silicon in an oxidized state (e.g., sub-stoiciometric silica ($SiO_x$) ($0<x<2$), silicon dioxide and/or silicon carbide). In specific embodiments, the nanoparticles comprise elemental silicon and silicon dioxide. In more specific embodiments, the nanoparticles comprise elemental silicon, silicon dioxide, and silicon carbide. In specific embodiments, the nanoparticles comprise elemental silicon and sub-stoiciometric silica. In more specific embodiments, the nanoparticles comprise elemental silicon, sub-stoiciometric silica, and silicon carbide. In some embodiments, the nanofibers comprises zero oxidation state silicon and greater than zero oxidation state silicon in an elemental ratio of at least 5:1 (e.g., 10:1, 20:1, 30:1, or the like).

In certain embodiments, the nanoparticles or discrete domains of a nanofiber provided herein have an average diameter of less than 100 nm. In specific embodiments, the nanoparticles or domains have an average diameter of 10 nm to 80 nm. In more specific embodiments, the nanoparticles or domains have an average diameter of 20 nm to 60 nm.

In some embodiments, a majority of the nanoparticles or discrete domains comprise a surface that is at least 50% coated with carbon. In specific embodiments, a majority of the nanoparticles or discrete domains comprise a surface that is at least 75% coated with carbon. In more specific embodiments, a majority of the nanoparticles or discrete domains comprise a surface that is at least 85% coated with carbon. In still more specific embodiments, a majority of the nanoparticles or discrete domains comprise a surface that is at least 90% coated with carbon. In yet more specific embodiments, a majority of the nanoparticles or discrete domains comprise a surface that is at least 95% coated with carbon. In some specific embodiments, at least 50%, at least 60%, at least 70%, at least 80%, at least 90%, or at least 95% of the nanoparticles or discrete domains comprise a surface that is at least 50%, at least 75%, at least 85%, at least 90%, or at least 95% coated with carbon.

In some embodiments, nanofibers provided herein comprise, on average, less than 25 wt. % of carbon (e.g., as measured by TGA or elemental analysis). In specific embodiments, the nanofibers comprise, on average, 1 wt % to 25 wt % carbon. In more specific embodiments, the nanofibers comprise, on average, 5 wt % to 25 wt % carbon. In yet more specific embodiments, the nanofibers comprise, on average, 5 wt % to 20 wt % carbon. In still more specific embodiments, the nanofibers comprise, on average, 10 wt % to 20 wt % carbon.

In some embodiments, nanofibers provided herein comprise, on average, at least 50 elemental wt. % of silicon (e.g., in zero and/or greater than zero oxidized state). In specific embodiments, nanofibers provided herein comprise, on average, at least 60 elemental wt. % of silicon. In more specific embodiments, nanofibers provided herein comprise, on average, at least 70 elemental wt. % of silicon. In still more specific embodiments, nanofibers provided herein comprise, on average, at least 75 elemental wt. % of silicon. In yet more specific embodiments, nanofibers provided herein comprise, on average, at least 80 elemental wt. % of silicon. In specific embodiments, nanofibers provided herein comprise, on average, at least 85 elemental wt. % of silicon. In some embodiments, nanofibers provided herein comprise, on average, at least 50 wt. % of silicon (i.e., zero oxidation/elemental silicon). In specific embodiments, nanofibers provided herein comprise, on average, at least 60 wt. % of silicon (i.e., zero oxidation/elemental silicon). In yet more specific embodiments, nanofibers provided herein comprise, on average, at least 70 wt. % of silicon (i.e., zero oxidation/elemental silicon). In still more specific embodiments, nanofibers provided herein comprise, on average, at least 75 wt. % of silicon (i.e., zero oxidation/elemental silicon). In more specific embodiments, nanofibers provided herein comprise, on average, at least 80 wt. % of silicon (i.e., zero oxidation/elemental silicon). In still more specific embodiments, nanofibers provided herein comprise, on average, at least 85 wt. % of silicon (i.e., zero oxidation/elemental silicon).

In certain embodiments, nanofibers provided herein (or anodes comprising such nanofibers) have a specific energy capacity of at least 1500 mAh/g on a first cycle at 0.1 C. In certain embodiments, nanofibers provided herein (or anodes comprising such nanofibers) have a specific energy capacity of at least 1200 mAh/g on a first cycle at 0.1 C. In specific embodiments, nanofibers provided herein (or anodes comprising such nanofibers) have a specific energy capacity of at least 2000 mAh/g on a first cycle at 0.1 C. In some embodiments, nanofibers provided herein (or anodes comprising such nanofibers) have a specific energy capacity of at least 1200 mAh/g on a 10th cycle at 0.1 C. In specific embodiments, nanofibers provided herein (or anodes comprising such nanofibers) have a specific energy capacity of at least 1000 mAh/g on a 10th cycle at 0.1 C. In some embodiments, nanofibers provided herein (or anodes comprising such nanofibers) have a specific energy capacity of at least 500 mAh/g on a 98th cycle at 0.1 C. In specific embodiments, nanofibers provided herein (or anodes comprising such nanofibers) have a specific energy capacity of at least 800 mAh/g on a 98th cycle at 0.1 C. In some embodiments, provided herein is a lithium ion battery comprising an anode comprising nanofibers described herein and the anode having a specific capacity described herein (e.g., at least 1200 mAh/g on a first cycle at 0.1 C).

In certain embodiments, the nanofiber(s) has an average diameter of less than 1 micron (e.g., less than 800 nm). In some embodiments, the nanofiber(s) has an average aspect ratio of at least 100 (e.g., at least 1000 or at least 10,000). In some embodiments, the nanofibers are cross-linked.

Also provided herein is an electrode comprising a nonwoven mat of a plurality of nanofibers described herein. Further, provided herein is a battery (e.g., lithium ion battery) comprising such an electrode. In more specific embodiments, the lithium ion battery comprises, such as in an initial or discharged state, a positive electrode, a separator, and a negative electrode, the negative electrode comprising any nanofiber as described herein, or a woven mat comprising one or a plurality of such nanofibers.

Provided in certain embodiments herein is a process of producing a nanofiber (e.g., as described above), the process comprising electrospinning a fluid stock, the fluid stock comprising or prepared by combining, in any order, a polymer, carbon and/or a carbon precursor, a fluid, and an optional metal component. In specific embodiments, the fluid comprises water or is aqueous. In some embodiments, the polymer is a water-soluble organic polymer. In some embodiments, the weight-to-weight ratio of the carbon and/or carbon precursor to polymer is at least 1:10 (e.g., at least 1:5, at least 1:4, at least 1:3, at least 1:2, at least 1:1, 1:10 to 1:1, or 1:5 to 1:1). In certain embodiments, the weight-to-weight ratio of the metal component (e.g., silicon nanoparticles) to polymer is at least 1:10 (e.g., at least 1:5, at least 1:4, at least 1:3, at least 1:2, at least 1:1, 1:10 to 1:1, or 1:5 to 1:1). In specific embodiments, the polymer-to-metal component-to-carbon and/or carbon precursor ratio is about 1:1:1. In certain embodiments, the weight ratio of the combination of the metal component and the carbon and/or carbon precursor component—to—polymer is at least 1:2 (e.g., at least 1:1, at least 3:2, at least 2:1 or the like). In some embodiments, the process further comprises thermally treating the as-spun nanofiber. In some embodiments, the thermal treatment occurs under inert conditions (e.g., to carbonize the polymer and carbon precursor). In further or alternative embodiments, the process further comprises reducing the as-spun (or a previously treated, e.g., thermally treated) nanofiber (e.g., concurrently with thermal treatment) (e.g., to minimize oxidation of metal components).

In some embodiments, the process further comprises, to prepare the fluid stock, comprises combining, in any order, the carbon and/or carbon precursor, the optional metal component, the polymer and a fluid medium (e.g., water or an aqueous solution).

Provided in certain embodiments herein is a process for preparing a nanofiber, the process comprising:
providing a fluid stock comprising a polymer and a high aspect ratio nanostructure; and
electrospinning the fluid stock, producing a spun nanofiber.

In specific embodiments, the high aspect ratio nanostructure has an aspect ratio of at least 2. In more specific embodiments, the high aspect ratio nanostructure has an aspect ratio of at least 5. In still more specific embodiments, the high aspect ratio nanostructure has an aspect ratio of at least 10.

In certain embodiments, the polymer is polyvinyl alcohol, polyvinyl acetate, polyethylene oxide, polyvinyl ether, polyvinyl pyrrolidone, polyglycolic acid, polyvinylidene difluoride, polyacrylonitrile, polyacrylic acid, polymethylmethacrylate, or a combination thereof, or any polymer described herein. In some embodiments, the fluid stock further comprises water, alcohol, hydrocarbon solvent, DMF, or a combination thereof, or any other solvent described herein. In certain embodiments, the electrospinning is gas assisted, e.g., according to any electrospinning process described herein. In specific embodiments, the electrospinning is coaxially gas assisted.

Disclosure of characteristics of a single nanofiber described herein includes the disclosure of a plurality of nanofibers having the average characteristic described. Similarly, disclosure of an average characteristic of a plurality of nanofibers includes the disclosure of a single nanofiber having the characteristic described.

In some embodiments, nanofibers provided herein or prepared according to a process herein comprise a continuous polymer matrix and a carbon nanoinclusion (e.g., precursor (e.g., nanostructured cellulose) or carbon allotrope (e.g., nanostructured graphene or carbon nanotubes)). In specific embodiments, the carbon nanoinclusions are embedded within the polymer matrix. In some embodiments, the polymer matrix has carbon nanoinclusions on the surface of and embedded within the matrix thereof. In certain embodiments, the nanoinclusions have an aspect ratio of greater than 1, and an axis along the length (longest dimension) of the nanostructure (the length being the longest dimension of the nanostructure). In specific embodiments, the nanoinclusions are substantially aligned along the same longitudinal axis the nanofiber (i.e., the axis running along the length of the nanofiber). In certain embodiments, at least 30% (e.g., at least 50%, or at least 75%) of the nanoinclusions are aligned within 15 degrees (e.g., within 10 degrees, or within 5 degrees) of the nanofiber axis.

In specific embodiments, the nanofibers provided herein have a polymer matrix and carbon nanotube inclusions. In more specific embodiments, the nanotube inclusions are substantially aligned along the same longitudinal axis of the nanofiber.

In further embodiments, nanofibers provided herein or prepared according to a process herein comprise a continuous polymer matrix, a carbon nanoinclusion (e.g., precursor (e.g., nanostructured cellulose) or carbon allotrope (e.g., nanostructured graphene or carbon nanotubes)), and a metal component (e.g., metal, metalloid, metal oxide, ceramic, or the like). In specific embodiments, the metal component is a nanostructured metal inclusion (e.g., silicon nanoparticles). In specific embodiments, the carbon nanoinclusions and metal nanoinclusions are embedded within the polymer matrix. In some embodiments, the polymer matrix has carbon nanoinclusions and metal nanoinclusions on the surface of and embedded within the matrix thereof.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Provided herein are nanofibers and nanofiber mats and processes for preparing nanofibers and nanofiber mats. In some embodiments, a nanofiber provided herein comprises a continuous polymer matrix and carbon and/or a carbon precursor embedded therein. In more specific embodiments, the nanofiber comprises a continuous polymer matrix, carbon (e.g., nanostructured carbon allotrope, such as CNT or graphene) and/or carbon precursor (e.g., nanostructured carbon precursor, such as CNC) embedded in the polymer matrix, and metal component (e.g., silicon) nanoparticles embedded in the polymer matrix (e.g., PVA or PAN). In further embodiments, a nanofiber provided herein comprises a carbon matrix, e.g., wherein the carbon matrix is prepared by thermal treatment of a continuous polymer matrix with carbon precursor embedded therein. In more specific embodiments, a nanofiber provided herein comprises a carbon matrix with a plurality of silicon nanoparticles embedded therein, e.g., wherein the carbon matrix is prepared by thermal treatment of a continuous polymer matrix with carbon precursor embedded therein. Also provided herein are processes, apparatuses, and systems for preparing such nanofibers.

Figure 1:
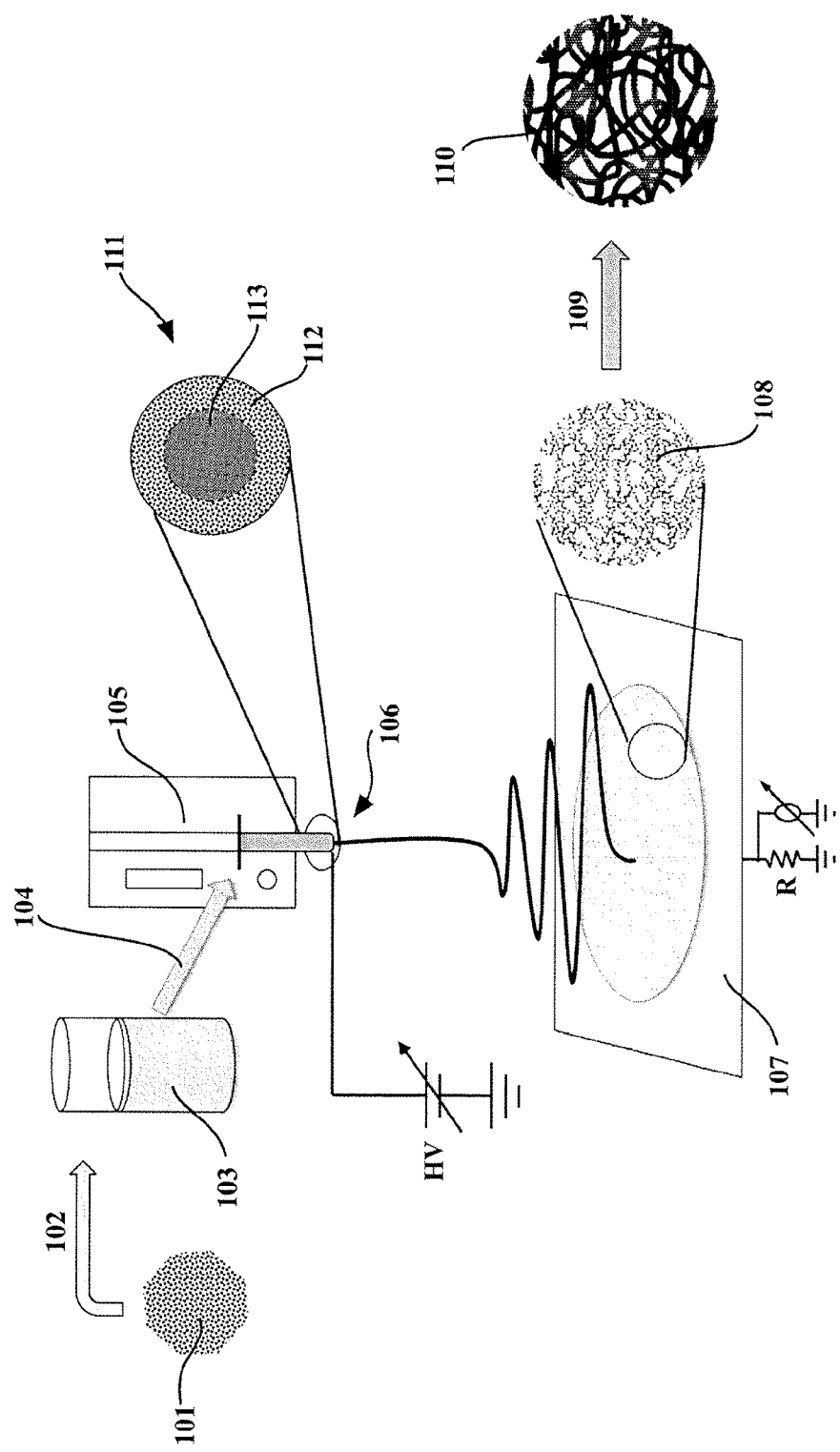
FIG. 1 describes a system for preparing a nanofiber wherein electrospinning of such a nanofiber, or precursor of such a nanofiber, is coaxially gas assisted.

FIG. 1 illustrates an as-spun nanofiber 108 and thermally treated nanofiber 110 provided herein and a process for preparing the same. In some instances, the as-spun nanofiber 108 comprises a polymer matrix, carbon and/or carbon precursor embedded in the polymer matrix, and an optional metal component embedded within the polymer matrix. FIG. 1 illustrates an exemplary system or schematic of a process described herein, particularly a system or process for preparing a nanofiber (e.g., by a coaxial gas assisted electrospinning process). In some instances, a fluid stock 104 (e.g., comprising (i) carbon and/or a carbon precursor, (ii) a polymer, and (iii) an optional metal component) is prepared by combining 102 carbon (e.g., CNT) and/or a carbon precursor (e.g., CNC) 101 with polymer and optional metal component (e.g., silicon nanoparticles). In some embodiments, the fluid stock is provided 104 to an electrospinning apparatus 105 having a needle apparatus 106. In some instances, the fluid stock is optionally electrospun through a needle apparatus 106, with an optional cross section illustrated by 111. In some instances, the fluid stock is electrospun through either of layers 112, or 113. In certain instances, the electrospinning is gas assisted and the gas, if present, is electrospun through any other of layers 112, or 113. Optionally, an additional coaxial layer providing gas may be utilized (e.g., if a hollow nanofiber is prepared, coaxial gas may be flowed through an inner and an outer needle in the needle apparatus 111). In some instances, such techniques provide a gas assisted electrospinning process or system. The fluid stocks may be provided to an electrospinning apparatus (e.g., an electrospinning needle apparatus with voltage supplied thereto—e.g., voltage sufficient to overcome the surface tension of a liquid polymer or polymer solution to produce a jet) by any device, e.g., by a syringe 105 or a pump. A gas may be provided to an electrospinning needle apparatus 106, 111 from any source (e.g., air pump). 111 is representative of an exemplary cross section of a coaxial needle apparatus or a coaxially layered nanofiber. For example, exemplary co-axial needles comprise an outer sheath tube (which would be represented by 112) at least one inner or core tube (which would be represented by 113). In specific embodiments, such tubes are aligned along a common axis (e.g., aligned within 5 degrees of one another). In some instances, the tubes are slightly offset, but the angle of the tubes is substantially aligned (e.g., within 5 degrees of one another). The electrospun jet 114 is collected on a collector 107 as an as-spun (hybrid or nanocomposite) nanofiber 108, which is optionally thermally treated 109 to produce carbonized nanofibers 110.

Figure 3:
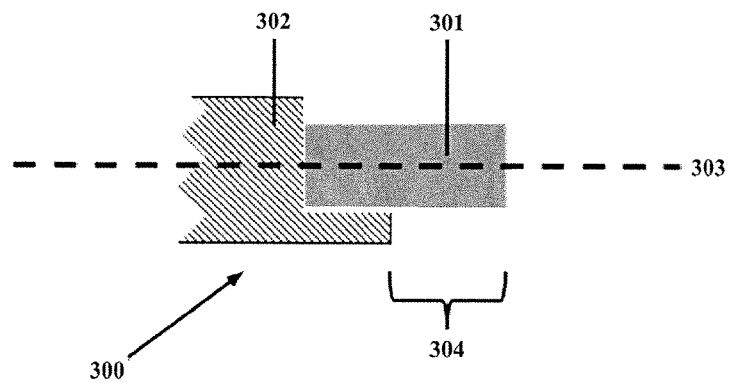
FIG. 3 illustrates a bi-layered co-axial electrospinning apparatus (with a cut-out of the outer needle), having an inner needle and an outer needle coaxially aligned about a common axis. In some instances, the inner and outer needles are configured to electrospin a first fluid stock along with a gas (e.g., in a gas assisted manner when the gas is in the outer layer or to provide hollow nanofibers when the gas is in the inner/core layer).

In some embodiments, gas assisted electrospinning processes or apparatus described herein providing a device configured to provide a flow of gas along the same axis as an electrospun fluid stock. In some instances, that gas (or gas needle) is provided along the same axis with the fluid stock (or fluid stock needle) (e.g., and adjacent thereto). In specific instances, the gas (or gas needle) is provided coaxially with the fluid stock (or fluid stock needle). FIG. 3 illustrates co-axial electrospinning apparatus 300. The coaxial needle apparatus comprises an inner needle 301 and an outer needle 302, both of which needles are coaxially aligned around a similar axis 303 (e.g., aligned with 5 degrees, 3 degrees, 1 degree, or the like). In some embodiments, further coaxial needles may be optionally placed around, inside, or between the needles 301 and 302, which are aligned around the axis 303 (e.g., as illustrated in FIG. 1). In some instances, the termination of the needles is optionally offset 304.

Figure 2A:
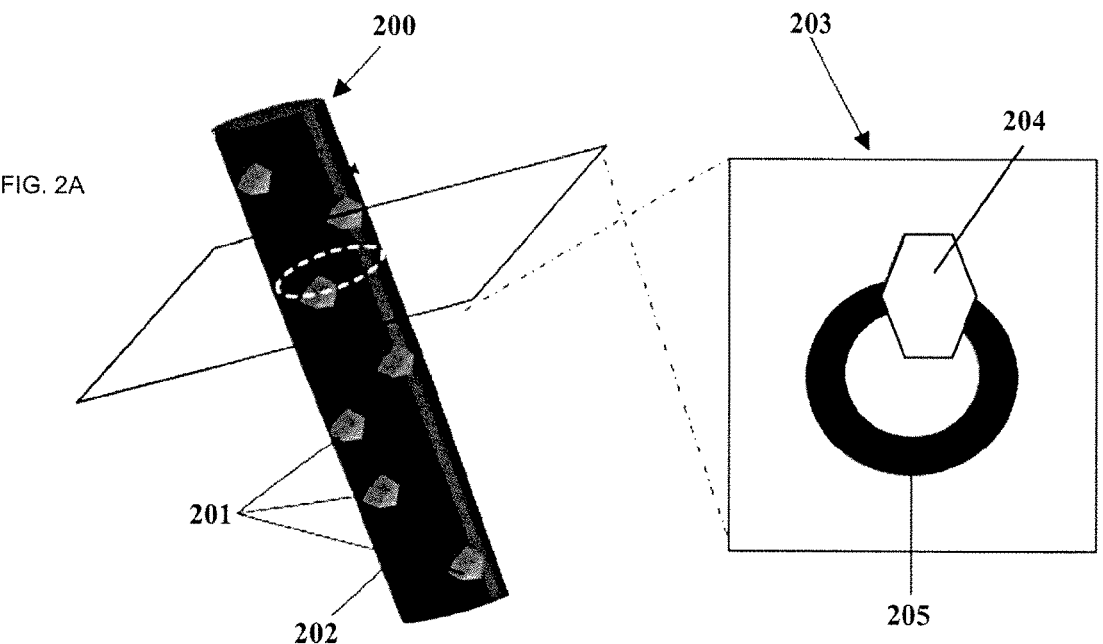
FIG. 2A illustrates a nanofiber, with a cross-sectional view (right panel), comprising (i) a hollow core, (ii) discrete domains of a first material in the sheath layer, and (iii) a continuous matrix (e.g., core matrix) of a second material in the sheath layer.
Figure 2B:
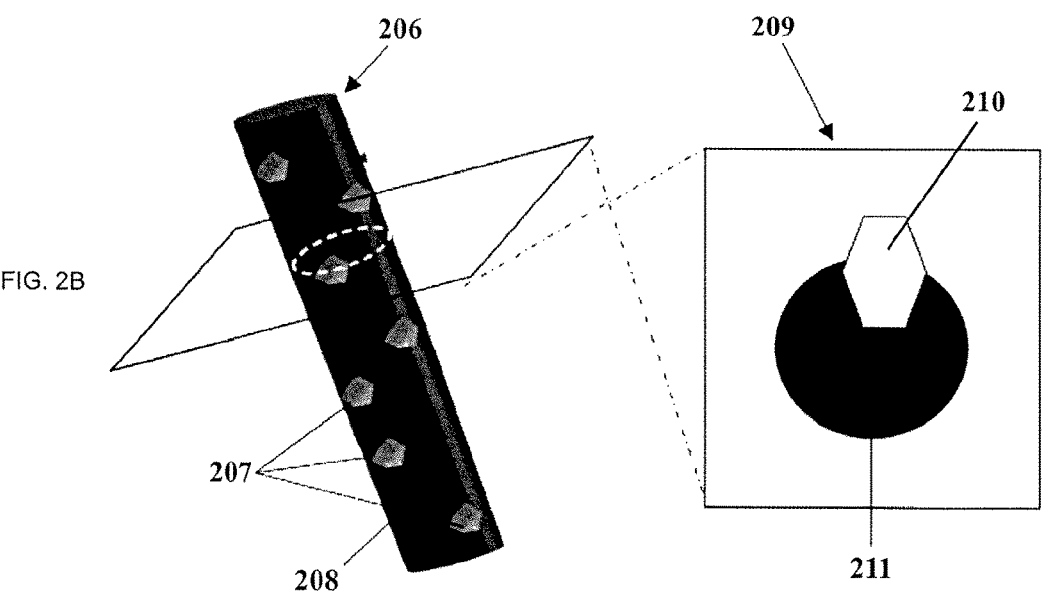
FIG. 2B illustrates a nanofiber, with a cross-sectional view (right panel), comprising (i) discrete domains of a first material, and (ii) a continuous matrix (e.g., core matrix) of a second material.

FIG. 2A illustrates a nanofiber 200 comprising (i) a hollow core, (ii) discrete domains of a metal component 201 embedded in (iii) a continuous carbon matrix 202 (sheath layer). As illustrated in the cross-sectional view 203, the discrete domains of silicon material 204 may penetrate into the core 205 of the nanofiber. FIG. 2B illustrates a nanofiber 206 comprising (i) discrete domains of silicon material 207 in/on a (ii) a continuous core matrix 208 layer. As illustrated in the cross-sectional view 209, the discrete domains of metal component 210 may penetrate into the core 211 of the nanofiber. In some instances, the nanofibers comprise metal component on the surface of the nanofiber. And in some instances, the nanofibers comprise or further comprise discrete domains of metal component completely embedded within the core matrix material.

In certain embodiments, continuous matrix materials of any nanofiber described herein is continuous over at least a portion of the length of the nanofiber. In some embodiments, the continuous matrix material runs along at least 10% the length of the nanofiber (e.g., on average for a plurality of nanofibers). In more specific embodiments, the continuous matrix material runs along at least 25% the length of the nanofiber (e.g., on average for a plurality of nanofibers). In still more specific embodiments, the continuous matrix runs along at least 50% the length of the nanofiber (e.g., on average for a plurality of nanofibers). In yet more specific embodiments, the continuous matrix runs along at least 75% the length of the nanofiber (e.g., on average for a plurality of nanofibers). In some embodiments, the continuous matrix is found along at least 50%, at least 60%, at least 70%, at least 80%, at least 90%, at least 95%, at least 98%, or at least 99% the length of the nanofiber (e.g., on average for a plurality of nanofibers). In some embodiments, the continuous matrix material runs along at least 1 micron of the length of the nanofiber (e.g., on average for a plurality of nanofibers). In more specific embodiments, the continuous matrix material runs along at least 10 microns of the length of the nanofiber (e.g., on average for a plurality of nanofibers). In still more specific embodiments, the continuous matrix runs along at least 100 microns of the length of the nanofiber (e.g., on average for a plurality of nanofibers). In yet more specific embodiments, the continuous matrix runs along at least 1 mm of the length of the nanofiber (e.g., on average for a plurality of nanofibers).

In some embodiments, a nanofiber provide herein comprises discrete domains within the nanofiber. In specific embodiments, the discrete domains comprise a silicon material. In certain embodiments, the discrete domains are non-aggregated. In some embodiments, the non-aggregated domains are dispersed, e.g., in a substantially uniform manner, along the length of the nanofiber.

In some embodiments, the metal component domains are non-aggregated. In specific embodiments, the nanofibers comprises less than 50% of domains (e.g., Si nanoparticles) that are aggregated. In specific embodiments, the nanofibers comprises less than 40% of domains (e.g., Si nanoparticles) that are aggregated. In specific embodiments, the nanofibers comprises less than 25% of domains (e.g., Si nanoparticles) that are aggregated. In specific embodiments, the nanofibers comprises less than 10% of domains (e.g., Si nanoparticles) that are aggregated. In specific embodiments, the nanofibers comprises less than 5% of domains (e.g., Si nanoparticles) that are aggregated.

In some embodiments, the carbon and/or carbon precursor is a nanostructured material and is present in a polymer-matrix containing nanofiber, the carbon and/or carbon precursor being non-aggregated. In specific embodiments, the nanofibers comprises less than 50% of carbon and/or carbon precursor nanostructures (e.g., CNC) that are aggregated. In specific embodiments, the nanofibers comprises less than 40% of carbon and/or carbon precursor nanostructures (e.g., CNC) that are aggregated. In specific embodiments, the nanofibers comprises less than 25% of carbon and/or carbon precursor nanostructures (e.g., CNC) that are aggregated. In specific embodiments, the nanofibers comprises less than 10% of carbon and/or carbon precursor nanostructures (e.g., CNC) that are aggregated. In specific embodiments, the nanofibers comprises less than 5% of carbon and/or carbon precursor nanostructures (e.g., CNC) that are aggregated.

In some embodiments, a nanofiber provided herein comprises nanoparticles (e.g., silicon or germanium) present in a matrix (e.g., polymer or carbon matrix), the nanoparticles being non-aggregated. In specific embodiments, less than 50% of nanoparticles are aggregated (in the nanofiber). In specific embodiments, less than 40% of nanoparticles are aggregated. In specific embodiments, less than 25% of nanoparticles are aggregated. In specific embodiments, less than 10% of nanoparticles are aggregated. In specific embodiments, less than 5% of nanoparticles are aggregated. In some embodiments, a nanofiber provided herein comprises (i) nanostructured carbon or carbon precursor and (ii) nanoparticles (e.g., silicon or germanium) present in a matrix (e.g., polymer or carbon matrix), the nanostructures and nanoparticles being non-aggregated. In specific embodiments, less than 50% of nanostructures and nanoparticles are aggregated (in the nanofiber). In specific embodiments, less than 40% of nanostructures and nanoparticles are aggregated. In specific embodiments, less than 25% of nanostructures and nanoparticles are aggregated. In specific embodiments, less than 10% of nanostructures and nanoparticles are aggregated. In specific embodiments, less than 5% of nanostructures and nanoparticles are aggregated.

Matrix Material

In certain embodiments, nanofibers provided and/or prepared according to processes described herein comprise a matrix material, such as polymer or carbon.

In some embodiments, a nanofiber provided herein comprises a polymer matrix and a carbon precursor. In certain embodiments, additional materials are optionally present (e.g., a metal component, such as silicon nanoparticles). In some embodiments, the nanofiber comprises at least 15 wt. %, at least 30 wt. %, at least 50 wt. %, or the like of the matrix material (e.g., polymer).

In some embodiments, a polymer in a process or nanofiber described herein is an organic polymer. In some embodiments, polymers used in the compositions and processes described herein are hydrophilic polymers, including water-soluble and water swellable polymers. In some aspects, the polymer is soluble in water, meaning that it forms a solution in water. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In other instances, solvent soluble polymers are utilized. In specific embodiments, polyacrylonitrile ("PAN") is optionally utilized (e.g., with DMF as a solvent). In other instances, a polyacrylate (e.g., polyalkacrylate, polyacrylic acid, polyalkylalkacrylate, or the like) is optionally utilized.

Polymers of any suitable molecular weight may be utilized in the processes and nanofibers described herein. In some instances, a suitable polymer molecular weight is a molecular weight that is suitable for electrospinning the polymer as a melt or solution (e.g., aqueous solution or solvent solution—such as in dimethyl formamide (DMF) or alcohol). In some embodiments, the polymer utilized has an average atomic mass of 1 kDa to 1,000 kDa. In specific embodiments, the polymer utilized has an average atomic mass of 10 kDa to 500 kDa. In more specific embodiments, the polymer utilized has an average atomic mass of 10 kDa to 250 kDa. In still more specific embodiments, the polymer utilized has an average atomic mass of 50 kDa to 200 kDa.

In certain embodiments, a nanofiber provided herein comprises a carbon matrix (e.g., prepared from thermal treatment—such as under inert or reducing conditions—of a polymer matrix and carbon and/or carbon precursor). In certain embodiments, additional materials are optionally present (e.g., a metal component, such as silicon nanoparticles). In some embodiments, the nanofiber comprises at least 3%, at least 5%, at least 10%, at least 15%, at least 20%, at least 30% or the like of the matrix material (e.g., carbon). In further or alternative embodiments, the nanofiber comprises less than 50 wt. %, less than 30 wt. %, less than 20 wt. %, or the like of the matrix material (e.g., carbon). In certain embodiments, the nanofibers comprise about 1 wt % to about 70 wt %, or about 5 wt % to about 50 wt %, or about 5 wt % to about 20 wt % of the matrix material (e.g., carbon or polymer).

In some embodiments, the matrix material is a continuous matrix material, such as a continuous core matrix or a continuous sheath matrix (e.g., surrounding a hollow core).

Carbon/Carbon Precursor

Figure 9:
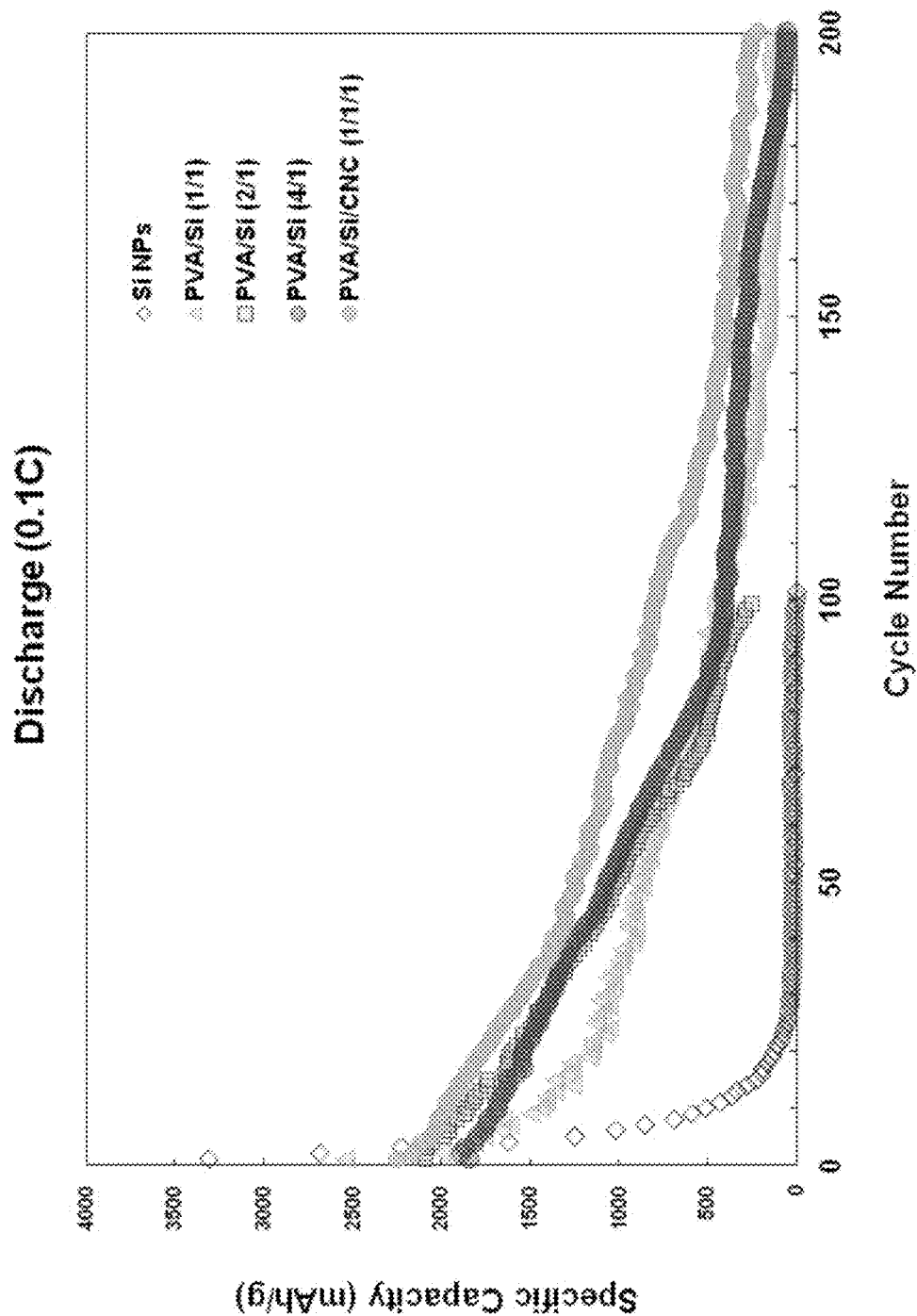
FIG. 9 illustrates the performance of various anodes prepared from carbon precursor containing nanofibers (e.g., Si/C nanofiber prepared from nanofibers comprising carbon precursor) to other anode systems (e.g., pure Si nanoparticles, and Si/C nanofibers prepared without the use of carbon precursor).

In various embodiments, the carbon precursor is any suitable carbon or organic material. In some embodiments, the carbon and/or carbon precursor is a nanostructured. In some instances, the carbon is a nanostructured carbon material, such as carbon nanotubes, graphitic nanoparticles, or the like. In some instances, the carbon is a non-organic carbon nanomaterial—e.g., a carbon allotrope, such as amorphous carbon, carbon nanotubes, graphene, graphite, or the like. In other embodiments, the nanostructured carbon precursor is a nanostructured organic compound. In specific embodiments, the nanostructured organic compound is a nanocrystal. In more specific embodiments, the nanostructured organic compound is a cellulose nanocrystal (CNC). In still more specific embodiments, the CNC is a sodium form of cellulose nanocrystals—e.g., as illustrated in FIG. 9 (repeat unit is illustrated—bond to the cell is absent in the CNC structures).

In certain embodiments, carbon precursors are compounds that are converted to carbon upon high temperature thermal treatment (e.g., under inert conditions).

In some embodiments, the carbon nanoinclusion provided herein is a carbon allotrope, such as carbon nanotubes, graphene, graphite, or the like. In certain embodiments, such carbon allotropes are optionally functionalized, e.g., with carboxyl groups (COOR), hydroxyl groups, alkoxyl groups (OR), amino groups ($NR_2$), thio groups (SR), combinations thereof, or the like (e.g., wherein each R is independently selected from H, alkyl, heteroalkyl, aryl, or heterocycle, in particular, H or alkyl). In the case of carbon nanotubes, the nanotubes are optionally single or multi-walled. In the case of graphene, the graphene is obtained by any suitable process, such as cutting open nanotubes, from (e.g., sonicating) graphite, carbon dioxide reduction, by the reduction of ethanol by sodium metal, followed by pyrolysis of the ethoxide product, or the like.

In some embodiments, nanostructured carbon and/or carbon precursors provided herein have an aspect ratio of at least 2. In certain embodiments, nanostructured carbon precursors with an high aspect ratio align lengthwise in the same direction as an as-spun nanofiber having a polymer matrix. In some instances upon thermal treatment and conversion of the polymer and the carbon precursor to a carbon matrix, the lengthwise alignment of the carbon precursor provides a more uniform and higher performance carbon nanofiber. In certain embodiments, nanostructured carbon and/or carbon precursors provided herein have an aspect ratio of at least 5. In more specific embodiments, nanostructured carbon and/or carbon precursors provided herein have an aspect ratio of at least 10.

In certain embodiments, nanostructured carbon and/or carbon precursors have any suitable dimensions, such as diameters, e.g., an average diameter of less than 50 nm. In more specific embodiments, nanostructured carbon and/or carbon precursors have an average diameter of less than 25 nm. In still more specific embodiments, nanostructured carbon and/or carbon precursors have an average diameter of less than 20 nm. In certain embodiments, nanostructured carbon and/or carbon precursors have an average diameter of 2 nm to 20 nm. In specific embodiments, nanostructured carbon and/or carbon precursors have an average diameter of 4 nm to 12 nm.

In certain embodiments, nanostructured carbon and/or carbon precursors have any suitable second dimension, such as length, e.g., an average length of at least 25 nm. In more specific embodiments, nanostructured carbon and/or carbon precursors have an average length of at least 50 nm. In still more specific embodiments, nanostructured carbon and/or carbon precursors have an average length of at least 100 nm. In certain embodiments, nanostructured carbon and/or carbon precursors have an average diameter of 50 nm to 300 nm. In specific embodiments, nanostructured carbon and/or carbon precursors have an average diameter of 100 nm to 250 nm.

In specific embodiments, nanostructured carbon (e.g., CNT, graphite, graphene) and/or carbon precursors (e.g., CNC) provided herein have an average diameter of 2 nm to 20 nm and an average length of 50 nm to 300 nm. In more specific embodiments, nanostructured carbon and/or carbon precursors (e.g., CNC) provided herein have an average diameter of 4 nm to 12 nm and an average length of 100 nm to 250 nm. In still more specific embodiments, nanostructured carbon and/or carbon precursors (e.g., CNC) provided herein have an average diameter of about 7-9 nm and an average length of about 90-110 nm. In other specific embodiments, nanostructured carbon and/or carbon precursors (e.g., CNC) provided herein have an average diameter of about 9-11 nm and an average length of about 140-160 nm. In still other specific embodiments, nanostructured carbon and/or carbon precursors (e.g., CNC) provided herein have an average diameter of about 5-7 nm and an average length of about 150-250 nm.

Metal Component

In various embodiments, the metal component in a nanofiber provided herein is any suitable metal material (e.g., a metal containing nanoparticle, such as a silicon nanoparticle). In some embodiments, the metal component comprises a transition metal, an alkali metal, an alkaline earth metal, a metalloid, or the like. In certain embodiments, the metal component comprises metal precursor (e.g., metal ions (e.g., from disassociated metal salt), metal salt, (such as metal acetate, metal nitrate, metal halide, or the like), nanoparticles (e.g., metal, metalloid, metal oxide, ceramic, or the like nanoparticles), or the like. In specific embodiments, the metal component comprises silicon, such as silicon, or a silicon alloy (e.g., a silicon metal oxide). In some embodiments, the metal component comprises silicon in a zero oxidation state (e.g., elemental silicon), a positive (greater than zero) oxidation state (e.g., sub-stoiciometric silica, silicon dioxide and/or silicon carbide), or a combination thereof. In certain embodiments, the silicon material is a material suitable for use in a lithium ion battery anode or negative electrode. In some embodiments, the silicon material is a precursor material capable of being converted into a material suitable for use in a lithium ion battery anode or negative electrode. In various embodiments, the silicon of the silicon material is in a crystalline state. In various embodiments, the silicon of the silicon material is in a zero oxidation state, a positive oxidation state, or a combination thereof. In specific embodiments, the silicon of the silicon material is generally in a zero oxidation state (e.g., a +0 oxidation state, or having an average oxidation state of less than +0.05, on average). In certain embodiments, the metal component is a metal precursor, such as a metal precursor of a material suitable for use as an anode material in a lithium ion battery. In some embodiments, metal precursors include, by way of non-limiting example, silicon precursors (e.g., silicon acetate), titanium precursors (e.g., titanium acetate), tin precursors (e.g., tin acetate), aluminum precursors (e.g., aluminum acetate), bismuth precursors (e.g., bismuth acetate), combinations thereof, or the like.

In specific embodiments, a nanofiber provided herein comprises silicon nanoparticles. In specific embodiments, the silicon nanoparticles comprise at least 70 wt. % zero oxidation silicon and less than 30 wt % silicon dioxide. In more specific embodiments, the silicon nanoparticles comprise at least 90 wt. % zero oxidation silicon and less than 10 wt % silicon dioxide. In still more specific embodiments, the silicon nanoparticles comprise 70-99 wt. % zero oxidation silicon and 0.01 (or 0.1) wt % to 30 wt % silicon dioxide. In certain embodiments, the silicon nanoparticles comprise zero oxidation state elemental silicon, silicon dioxide, and silicon carbide. In specific embodiments, a nanofiber provided herein comprises silicon nanoparticles. In specific embodiments, the silicon nanoparticles comprise at least 70 wt. % zero oxidation silicon and less than 30 wt % $SiO_y$ ($0<y\leq2$). In more specific embodiments, the silicon nanoparticles comprise at least 90 wt. % zero oxidation silicon and less than 10 wt % $SiO_y$ ($0<y\leq2$). In still more specific embodiments, the silicon nanoparticles comprise 70-99 wt. % zero oxidation silicon and 0.01 (or 0.1) wt % to 30 wt % $SiO_y$ ($0<y\leq2$). In certain embodiments, the silicon nanoparticles comprise zero oxidation state elemental silicon, $SiO_y$ ($0<y\leq2$), and silicon carbide.

In certain embodiments, the discrete silicon material domain (e.g., silicon nanoparticle) has an average diameter of less than 200 nm. In specific embodiments, the average diameter is 1 nm to 200 nm. In some embodiments, the average diameter is less than 100 nm. In specific embodiments, the average diameter is 10 nm to 100 nm. In more specific embodiments, the average diameter is 10 nm to 80 nm. In still more specific embodiments, the average diameter is 20 nm to 70 nm.

In certain embodiments, provided herein are nanofibers comprising a silicon material, the silicon material comprising silicon (and other optional elements). In specific embodiments, the nanofibers comprise at least 25% by weight of the silicon material (e.g., on average for a plurality of nanofibers). In more specific embodiments, the nanofibers comprise at least 50% by weight of the silicon material (e.g., on average for a plurality of nanofibers). In still more specific embodiments, the nanofibers comprise at least 60% by weight of the silicon material (e.g., on average for a plurality of nanofibers). In yet more specific embodiments, the nanofibers comprise at least 70% by weight of the silicon material (e.g., on average for a plurality of nanofibers). In specific embodiments, the nanofibers comprise at least 80% by weight of the silicon material (e.g., on average for a plurality of nanofibers).

In certain embodiments, the nanofibers comprise at least 25% by weight of silicon (e.g., on an elemental basis) (e.g., on average for a plurality of nanofibers). In specific embodiments, the nanofibers comprise at least 50% by weight of the silicon (e.g., on average for a plurality of nanofibers). In more specific embodiments, the nanofibers comprise at least 75% by weight of silicon (e.g., on average for a plurality of nanofibers). In yet more specific embodiments, the nanofibers comprise at least 90% by weight of silicon (e.g., on average for a plurality of nanofibers). In specific embodiments, the nanofibers comprise at least 95% by weight of silicon (e.g., on average for a plurality of nanofibers).

In some embodiments, the silicon material comprises silicon, silicon oxide, sub-stoiciometric silica, silicon carbide or a combination thereof. In specific embodiments, the silicon material comprises silicon. In some embodiments, the silicon of the silicon material is substantially in a zero oxidation state. In specific embodiments, at least 50%, at least 60%, at least 70%, at least 80%, at least 90%, at least 95%, or the like of the silicon in the silicon material is in a neutral (zero) oxidation state.

Nanofibers

In certain embodiments, nanofiber provided herein have any suitable characteristic.

In some embodiments, a nanofiber provided herein has a diameter of less than 2 microns (e.g., an average diameter of a plurality of nanofibers). In specific embodiments, a nanofiber provided herein has a diameter of less than 1.5 microns (e.g., an average diameter of a plurality of nanofibers). In more specific embodiments, a nanofiber provided herein has a diameter of less than 1 micron (e.g., an average diameter of a plurality of nanofibers). In still more specific embodiments, a nanofiber provided herein has a diameter of less than 750 nm (e.g., an average diameter of a plurality of nanofibers). In yet more specific embodiments, a nanofiber provided herein has a diameter of less than 500 nm (e.g., an average diameter of a plurality of nanofibers). In more specific embodiments, a nanofiber provided herein has a diameter of less than 250 nm (e.g., an average diameter of a plurality of nanofibers).

In some embodiments, nanofibers provided herein have a (e.g., average) length of at least 1 µm, at least 10 µm, at least 20 µm, at least 100 µm, at least 500 µm, at least 1,000 µm, at least 5,000 µm, at least 10,000 µm, or the like.

In some embodiments, a nanofiber provided herein has an aspect ratio of greater than 10 (e.g., an average aspect ratio of a plurality of nanofibers). In specific embodiments, a nanofiber provided herein has an aspect ration of greater than 100 (e.g., an average aspect ratio of a plurality of nanofibers). In more specific embodiments, a nanofiber provided herein has an aspect ration of greater than 500 (e.g., an average aspect ratio of a plurality of nanofibers). In still more specific embodiments, a nanofiber provided herein has an aspect ration of greater than 1000 (e.g., an average aspect ratio of a plurality of nanofibers). In yet more specific embodiments, a nanofiber provided herein has an aspect ration of greater than $10^4$ (e.g., an average aspect ratio of a plurality of nanofibers).

In some embodiments, nanofibers provided herein comprise (e.g., on average) at least 99%, at least 98%, at least 97%, at least 96%, at least 95%, at least 90%, at least 80%, or the like of metal, oxygen and carbon, when taken together, by mass (e.g., elemental mass). In specific embodiments, nanofibers (e.g., on average) provided herein comprise at least 99%, at least 98%, at least 97%, at least 96%, at least 95%, at least 90%, at least 80%, or the like of silicon, carbon, and oxygen, when taken together, by mass (e.g., elemental mass). In specific embodiments, nanofibers (e.g., on average) provided herein comprise at least 99%, at least 98%, at least 97%, at least 96%, at least 95%, at least 90%, at least 80%, or the like of silicon and carbon, when taken together, by mass (e.g., elemental mass).

Batteries and Electrodes

In some embodiments, provided herein is a battery (e.g., a primary or secondary cell) comprising at least one nanofiber described herein. In specific instances, the battery comprises plurality of such nanofibers, e.g., a non-woven mat thereof. In some embodiments, the battery comprises at least two electrodes (e.g., an anode and a cathode) and a separator, at least one of the electrodes comprising at least one nanofiber described herein. In specific embodiments, the battery is a lithium-ion battery and the anode comprises at least one nanofiber described herein (e.g., a nanofiber mat thereof). Likewise, provided herein is an electrode comprising any nanofiber described herein (e.g., a nanofiber mat comprising one or more such nanofibers).

In some embodiments, the batteries comprise a negative electrode (anode) comprising a plurality of nanofibers described herein. In specific embodiments, the negative electrode or plurality of nanofibers have a discharge capacity or specific energy capacity of at least 1200 mAh/g on a first cycle at 0.1 C (e.g., as determined by half cell or full cell testing). In specific embodiments, the negative electrode or plurality of nanofibers have a discharge capacity or specific energy capacity of at least 1500 mAh/g on a first cycle at 0.1 C (e.g., as determined by half cell or full cell testing). In further or alternative embodiments, the negative electrode or plurality of nanofibers have a discharge capacity or specific energy capacity of at least 2000 mAh/g on a first cycle at 0.1 C. In further or alternative embodiments, the negative electrode or plurality of nanofibers have a discharge capacity or specific energy capacity of at least 1050 mAh/g on a 10th cycle at 0.1 C. In further or alternative embodiments, the negative electrode or plurality of nanofibers have a discharge capacity or specific energy capacity of at least 1400 mAh/g on a 10th cycle at 0.1 C. In further or alternative embodiments, the negative electrode or plurality of nanofibers have a discharge capacity or specific energy capacity of at least 1800 mAh/g on a 10th cycle at 0.1 C. In further or alternative embodiments, the negative electrode or plurality of nanofibers have a discharge capacity or specific energy capacity of at least 750 mAh/g on a 50th cycle at 0.1 C. In further or alternative embodiments, the negative electrode or plurality of nanofibers have a discharge capacity or specific energy capacity of at least 1000 mAh/g on a 50th cycle at 0.1 C. In further or alternative embodiments, the negative electrode or plurality of nanofibers have a discharge capacity or specific energy capacity of at least 1600 mAh/g on a 50th cycle at 0.1 C. In further or alternative embodiments, the negative electrode or plurality of nanofibers have a discharge capacity or specific energy capacity of at least 250 mAh/g on a 98th cycle at 0.1 C. In further or alternative embodiments, the negative electrode or plurality of nanofibers have a discharge capacity or specific energy capacity of at least 400 mAh/g on a 98th cycle at 0.1 C.

In some embodiments, negative electrodes provided herein are prepared by depositing high energy (anodic) capacity nanofibers (e.g., comprising a carbon matrix with silicon nanoparticles embedded therein) onto a current collector, thereby creating a negative electrode comprising the nanofibers in contact with a current collector. In certain embodiments, as-treated nanofibers are ground in a mortal and pestle to produce processed nanofibers, which are then deposited on a current collector. In some embodiments, the processed nanofibers are dispersed in a solvent to prepare a composition, the composition is deposited onto a current collector, and evaporation of the solvent results in formation of an electrode on the current collector. In specific embodiments, the composition further comprises a binder. In further or alternative specific embodiments, the composition further comprises a conductive material (e.g., carbon black)—e.g., to improve electron mobility.

Process

In certain embodiments, provided herein is a process for preparing a nanofiber, the process comprising:

providing a fluid stock comprising a polymer and carbon and/or a carbon precursor; and electrospinning the fluid stock.

In certain embodiments, provided herein is a process for preparing a nanofiber, the process comprising:

providing a fluid stock comprising a polymer and a high aspect ratio nanostructure; and electrospinning the fluid stock.

In certain embodiments, such a nanofiber comprises a continuous polymer matrix with carbon and/or carbon precursor (e.g., nanostructured carbon and/or carbon precursor) embedded therein. In some embodiments, the nanostructured carbon precursor has an aspect ratio of greater than 2 (e.g., greater than 10). In specific embodiments, a plurality or a majority of the nanostructured carbon and/or carbon precursors are aligned (i.e., along the length of the nanostructured carbon precursor) with (i.e., in the same direction, e.g., within 5 or 10 degrees of parallel) the nanofiber (i.e., along the length of the nanofiber). In some embodiments, the fluid stock comprises polymer:carbon precursor (e.g., CNC) in a wt. to wt. ratio of 4:1 to 1:4, e.g., 2:1 to 1:2. In some embodiments, the fluid stock comprises polymer:carbon (e.g., CNT) in a wt. to wt. ratio of 4:1 to 1:4, e.g., 2:1 to 1:2.

In certain embodiments, provided herein is a process for preparing a nanofiber, the nanofiber comprising a continuous carbon matrix, the process comprising:

providing a fluid stock comprising (i) a polymer and (ii) carbon and/or a carbon precursor;

electrospinning the fluid stock, producing an as-spun nanofiber; and thermally treating the as-spun nanofiber (e.g., under inert or reducing conditions), producing a nanofiber comprising a continuous carbon matrix.

In some embodiments, the nanostructured carbon and/or carbon precursor has an aspect ratio of greater than 2 (e.g., greater than 10). In specific embodiments, a plurality or a majority of the nanostructured carbon and/or carbon precursors are aligned (i.e., along the length of the nanostructured carbon precursor) with (i.e., in the same direction, e.g., within 5 or 10 degrees of parallel) the as-spun nanofiber (i.e., along the length of the nanofiber). In some embodiments, the fluid stock comprises polymer:carbon precursor (e.g., CNC) in a wt. to wt. ratio of 4:1 to 1:4, e.g., 2:1 to 1:2. In some embodiments, the fluid stock comprises polymer:carbon (e.g., CNT) in a wt. to wt. ratio of 4:1 to 1:4, e.g., 2:1 to 1:2.

In some embodiments, provided herein is a process for preparing a nanofiber, the nanofiber comprising a continuous carbon matrix, the process comprising:

providing a fluid stock comprising a polymer, carbon and/or a carbon precursor, and a metal component (e.g., a metal precursor or metal-containing nanoparticle);

electrospinning the fluid stock, producing an as-spun nanofiber; and thermally treating the as-spun nanofiber (e.g., under inert or reducing conditions), producing a nanofiber comprising a continuous carbon matrix.

In certain embodiments, such a nanofiber comprises a continuous carbon matrix with metal component domains therein (e.g., metal containing nanoparticles, such as silicon nanoparticles, embedded therein). In some embodiments, the nanostructured carbon and/or carbon precursor has an aspect ratio of greater than 2 (e.g., greater than 10). In specific embodiments, a plurality or a majority of the nanostructured carbon and/or carbon precursors are aligned (i.e., along the length of the nanostructured carbon precursor) with (i.e., in the same direction, e.g., within 5 or 10 degrees of parallel) the nanofiber (i.e., along the length of the nanofiber). In some embodiments, the fluid stock comprises polymer:carbon precursor (e.g., CNC) in a wt. to wt. ratio of 4:1 to 1:4, e.g., 2:1 to 1:2. In some embodiments, the fluid stock comprises polymer:carbon (e.g., CNT) in a wt. to wt. ratio of 4:1 to 1:4, e.g., 2:1 to 1:2. In certain embodiments, the fluid stock comprises polymer:(carbon (e.g., CNT) plus metal component (e.g., Si NP)) in a wt. to wt. ratio of 4:1 to 1:4, e.g., 2:1 to 1:2.

In specific embodiments, the fluid stock comprises an aqueous medium (e.g., water or an aqueous mixture, such as water/alcohol, water/acetic acid, or the like). In other embodiments, the fluid stock comprises an organic solvent, such as dimethylformamide (DMF).

In some embodiments, thermal treatment of the as-spun nanofiber comprises thermally treating the as-spun nanofiber under under inert conditions (e.g., argon or nitrogen). In still other specific embodiments, thermal treatment of the as-spun nanofiber comprises thermally treating the as-spun nanofiber under reducing conditions (e.g., hydrogen, or a hydrogen/argon blend). In certain embodiments, the as-spun nanofiber is heated to a temperature of about 500° C. to about 2000° C., at least 900° C., at least 1000° C., or the like. In specific embodiments, the as-spun nanofiber is heated to a temperature of about 1000° C. to about 1800° C., or about 1000° C. to about 1700° C. In specific embodiments, the thermal treatment step is at 600° C. to 1200° C. In more specific embodiments, the thermal treatment step is at 700° C. to 1100° C. In still more specific embodiments, the thermal treatment step is at 800° C. to 1000° C. (e.g., in an inert or reducing atmosphere).

In one aspect, the process has a high yield (e.g., which is desirable for embodiments in which the precursor is expensive). In some embodiments, the metal atoms in the nanofiber are about 3%, about 10%, about 20%, about 30%, about 33%, about 40%, about 50%, about 60%, about 70%, about 80%, about 90%, about 95%, about 98%, or about 100% of the number of (e.g., in moles) metal (i.e., silicon and other metal) molecules in the fluid stock.

In some embodiments, the fluid stock uniform or homogenous. In specific embodiments, the process described herein comprises maintaining fluid stock uniformity or homogeneity. In some embodiments, fluid stock uniformity and/or homogeneity is achieved or maintained by any suitable mechanism, e.g., by agitating, heating, or the like. Methods of agitating include, by way of non-limiting example, mixing, stirring, shaking, sonicating, or otherwise inputting energy to prevent or delay the formation of more than one phase in the fluid stock.

In certain embodiments, provided herein are nanofibers and fluid stocks wherein the carbon and/or carbon precursor (e.g., nanostructured carbon or carbon precursor, such as CNC or CNT) to polymer weight ratio is at least 1:10, at least 1:5, at least 1:4, at least 1:3, at least 1:2, or the like. In some instances, provided herein are nanofibers and fluid stocks wherein the metal component of a process described herein is a preformed nanoparticle (e.g., silicon nanoparticle), the metal component to polymer weight ratio is at least 1:5, at least 1:4, at least 1:3, at least 1:2, or the like. In certain embodiments, the total inclusion (e.g., metal component and carbon and/or carbon precursor) to polymer ratio is about 1:99 to about 95:5 in a fluid stock or of a nanofiber (e.g., comprising a polymer matrix—such as a precursor nanofiber) provided herein. In some embodiments, the total inclusion to polymer ratio is about 33:67 to about 90:10 in a fluid stock or nanofiber provided herein. In specific embodiments, the total inclusion to polymer ratio is about 50:50 to about 80:20 in a fluid stock or nanofiber provided herein.

In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In some embodiments, the fluid stock comprises at least about 0.5 weight %, at least about 1 weight %, at least about 2 weight %, at least about 5 weight %, at least about 10 weight %, or at least about 20 weight polymer.

Electrospinning

In some embodiments, the process comprises electrospinning a fluid stock. Any suitable method for electrospinning is used.

In some embodiments, provided herein is a process for preparing a nanofiber, the process comprising:

providing a fluid stock to a first conduit of an electrospinning nozzle apparatus, the first conduit being enclosed along the length of the conduit by a first wall having an interior and an exterior surface, the first conduit having a first inlet end and a first outlet end, and the first conduit having a first diameter; and providing a gas (e.g., a pressurized or high speed gas) to a second conduit of an electrospinning apparatus, the second conduit being enclosed along the length of the conduit by a second wall having an interior surface, the second conduit having a second inlet end and a second outlet end, and the second conduit having a second diameter.

In certain embodiments, the first and second conduit having a conduit overlap length (for example, FIG. 3 illustrates a portion of the overlap of two conduits 301 and 302). In some embodiments, the first conduit (e.g., 301 in FIG. 3) is positioned inside the second conduit (e.g., 302 in FIG. 3), the exterior surface of the first wall and the interior surface of the second wall being separated by a conduit gap. In certain embodiments, the first outlet end protruding beyond the second outlet end by a protrusion length (an example of which is illustrated by 304 in FIG. 3). In some instances, the ratio of the conduit overlap length-to-second diameter is about 10 or more (e.g., about 13 or more, or about 18 or more). In further or alternative embodiments, the ratio of the average conduit gap-to-second diameter about 0.2 or less (e.g., about 0.1 or less, or about 0.05 or less). In further or alternative embodiments, the ratio of the protrusion length-to-second diameter is about 0.3 or less. In certain embodiments, the fluid stock is provided to the first conduit at any suitable rate, e.g., at a rate of at least 0.05 mL/min (e.g., about 0.05 mL/min to about 3 mL/min). In more specific embodiments, the rate is at least 0.5 mL/min (e.g., about 0.5 mL/min to about 2.5 mL/min). In some embodiments, the gas is provided to the second conduit at any suitable speed or pressure. In specific embodiments, the gas is provided at a pressure of about 15 to about 30 psi, e.g., about 25 psi. In certain embodiments, the conduits have any suitable shape, such as conical (e.g., circular or elliptical), conical (e.g., circular or elliptical), prismatic, or the like. In specific instances, the first conduit and the first wall, taken together, form a first needle, and the second conduit and the second wall, taken together, form a second needle. In various embodiments, any suitable first and second diameter is utilized. For example, in specific instances, the first diameter being about 0.05 mm to about 3 mm. In further or alternative embodiments, the second diameter is about 0.1 mm to about 5 mm. In certain embodiments, the conduit gap is on average 0.5 mm or less (e.g., about 0.01 mm to about 0.5 mm). In some embodiments, a voltage is applied to the nozzle apparatus to electrospin the fluid stock. Any suitable voltage is optionally applied to the nozzle, such as about 5 kV to about 50 kV. In specific embodiments, the voltage is about 20 kV to about 30 kV, such as about 25 kV. Further and more specific embodiments are described in U.S. Provisional Patent Application No. 61/7981,260 and the corresponding PCT application(s) claiming priority thereto, all of which are incorporated herein for such disclosure.

In some instances, elevated temperature electrospinning is utilized. Exemplary methods for comprise methods for electrospinning at elevated temperatures as disclosed in U.S. Pat. Nos. 7,326,043 and 7,901,610, which are incorporated herein for such disclosure. In some embodiments, elevated temperature electrospinning improves the homogeneity of the fluid stock throughout the electrospinning process.

In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some instances, gas assisted electrospinning disperses silicon material in nanofibers. For example, in some instances, gas assisted electrospinning (e.g., coaxial electrospinning of a gas—along a substantially common axis—with a fluid stock comprising Si nanoparticles) facilitates dispersion or non-aggregation of the Si nanoparticles in the electrospun jet and the resulting as-spun nanofiber (and subsequent nanofibers produced therefrom). In some embodiments, incorporating a gas stream inside a fluid stock produces hollow nanofibers. In some embodiments, the fluid stock is electrospun using any suitable technique.

In specific embodiments, the process comprises coaxial electrospinning (electrospinning two or more fluids about a common axis). As described herein, coaxial electrospinning a first fluid stock as described herein (e.g., comprising carbon/carbon precursor and polymer) with a second fluid is used to add coatings, make hollow nanofibers, make nanofibers comprising more than one material, and the like. In various embodiments, the second fluid is either outside (i.e., at least partially surrounding) or inside (e.g., at least partially surrounded by) the first fluid stock. In some embodiments, the second fluid is a gas (gas-assisted electrospinning). In some embodiments, gas assistance increases the throughput of the process, reduces the diameter of the nanofibers, is used to produce hollow nanofibers, and/or reduces nanostructure and/or nanoparticle aggregation in as-spun nanofibers. In some embodiments, the method for producing nanofibers comprises coaxially electrospinning the first fluid stock and a gas.

The term "alkyl" as used herein, alone or in combination, refers to an optionally substituted straight-chain, optionally substituted branched-chain or optionally substituted carbocyclic saturated or unsaturated hydrocarbon radical.

Examples include, but are not limited to methyl, ethyl, propyl, butyl, pentyl, hexyl, and longer alkyl groups, such as heptyl, octyl and the like. certain instances, "alkyl" groups described herein include linear and branched alkyl groups, saturated and unsaturated alkyl groups, and cyclic and acyclic alkyl groups.

The term "aryl" as used herein, alone or in combination, refers to an optionally substituted aromatic hydrocarbon radical of six to about twenty ring carbon atoms, and includes fused and non-fused aryl rings. A non-limiting example of a single ring aryl group includes phenyl; a fused ring aryl group includes naphthyl.

The term "heterocycle" as used herein, alone or in combination, refers to optionally substituted cyclic monoradicals containing from about five to about twenty skeletal ring atoms, where one or more of the ring atoms is a heteroatom independently selected from among oxygen, nitrogen, sulfur, phosphorous, silicon, selenium and tin but not limited to these atoms and with the proviso that the ring of the group does not contain two adjacent O or S atoms.

EXAMPLES

Example 1—Preparing an Electrospinning Fluid Stock 1 grams of preformed nanostructured carbon and/or carbon precursor is suspended in 20 ml of 1 molar acetic acid solution with X-100 surfactant. The combination is optionally stirred for 2 hours, sonicated, or the like to create a first composition.

In a second composition, 1 gram of 99.7% hydrolyzed polyvinyl alcohol (PVA) with an average molecular weight of 79 kDa and polydispersity index of 1.5 is dissolved in 10 ml of de-ionized water. The polymer solution is optionally heated to a temperature of 95° C. and stirred for 2 hours to create a homogenous solution.

The first and second compositions are then combined to create a fluid stock. In order to distribute the carbon/carbon precursor substantially evenly in the fluid stock, the first composition is optionally added gradually to the second composition while being continuously vigorously stirred for 2 hours. The mass ratio of carbon/carbon precursor to polymer for the fluid stock is 1:1.

Example 2—Preparing Polymer Composite Nanofiber and Carbon Nanofiber

The fluid stock is co-axially electrospun with gas using a coaxial needle apparatus similar to the one depicted in FIG. 1 (where 111 illustrates the needle apparatus). The center conduit contains fluid stock of Example 1 and the outer conduit contains air. The electrospun fluid stock (as-spun nanofiber) is calcinated by heating for 2 hours at 400-1200° C. in an inert atmosphere (e.g., argon).

Example 3—Preparing CNC/Polymer Composite Nanofibers and Nanofibers Having Carbon Matrix Example 3A Using a process similar to Example 1, a fluid stock is prepared using 0.2 g of cellulose nanocrystal (CNC) (8 nm average diameter, 100 nm average length) as the carbon precursor. The resultant polymer:precursor weight ratio is 5:1. The fluid stock is electrospun according to a process of Example 2.

Example 3B

Using a process similar to Example 1, a fluid stock is prepared using 0.1 g of cellulose nanocrystal (CNC) (8 nm average diameter, 100 nm average length) as the carbon precursor. The resultant polymer:precursor weight ratio is 10:1. The fluid stock is electrospun according to a process of Example 2.

Example 4—Preparing CNT/Si NP/Polymer Composite Nanofibers and Si/C Composite Nanofibers Using a process similar to Example 1, a fluid stock is prepared using 0.1 g of carbon nanotubes as a carbon inclusion. In addition, 1 gram of preformed silicon nanoparticles (~50 nm average diameter) is added to the first composition. The resultant polymer:nanoparticle:precursor weight ratio is 10:10:1.

Figure 4A:
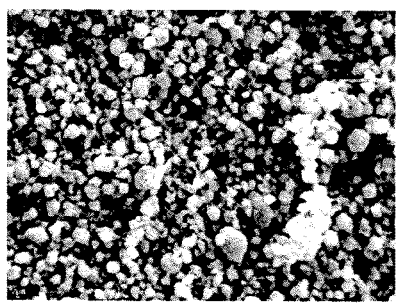
FIG. 4A illustrates as-spun carbon (CNT) and nanoparticles (Si NP) in polymer matrix nanofibers, FIG. 4C an increased magnification image over image FIGS. 4A, 4B thermally treated nanofibers therefrom, and FIG. 4D an increased magnification image over image FIG. 4B.
Figure 4C:
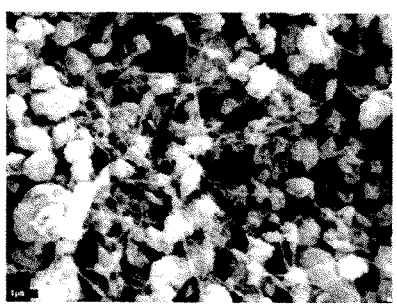
Figure 4B:
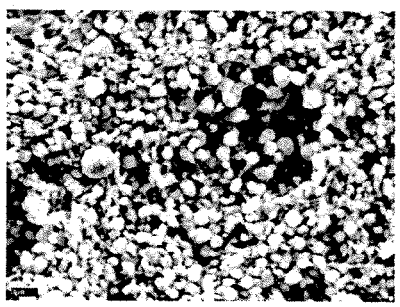
Figure 4D:
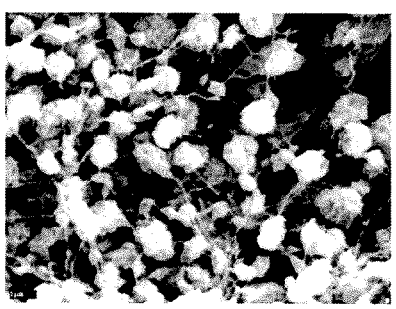

The fluid stock is electrospun according to a process of Example 2. FIG. 4A illustrates as-spun nanofibers and nanoparticles (Si NP) in polymer matrix nanofibers; FIG. 4C is an increased magnification image over image FIG. 4A; FIG. 4B illustrates thermally treated (at 900° C. for 5 hours under argon) nanofibers therefrom; and FIG. 4D an increased magnification image over image FIG. 4B.

Example 5—Preparing Carbon Allotrope/Polymer Composite Nanofibers

Using a process similar to Example 1, a fluid stock is prepared using 0.1 g of carbon nanotubes as a carbon precursor. The resultant polymer:precursor weight ratio is 10:1.

Figure 11:
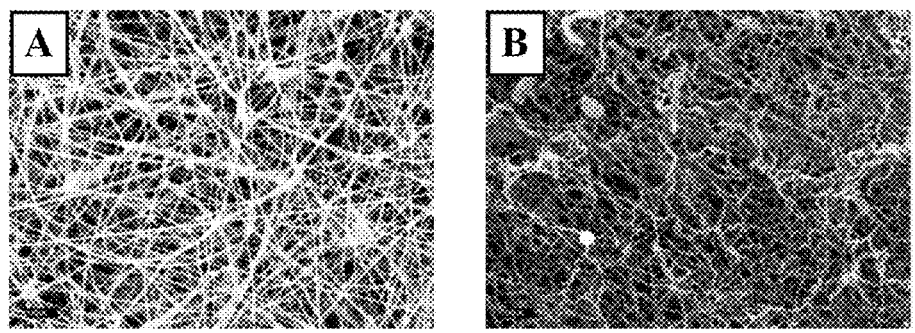
FIG. 11A illustrates an SEM image of carbon allotrope/polymer composite nanofibers, and FIG. 11B carbon nanofibers prepared by carbonizing such nanofibers.

Also, using a process similar to Example 1, a fluid stock is prepared with carbon black (Super P) and PVA at various PVA:Super P molar ratios (e.g., 2.1, 3.14 and >3.14). The fluid stock is electrospun and carbonized. FIG. 11A illustrates an SEM image of electrospun carbon allotrope/polymer composite nanofibers; and FIG. 11B illustrates carbonized nanofibers prepared by carbonizing such nanofibers.

Example 6—Preparing CNC/Si NP/Polymer Composite Nanofibers and Si/C Composite Nanofibers Example 6A Using a process similar to Example 1, a fluid stock is prepared using 0.2 g of cellulose nanocrystal (CNC) (8 nm average diameter, 100 nm average length) as the carbon precursor. In addition, 1 gram of preformed silicon nanoparticles (~50 nm average diameter) is added to the first composition. The resultant polymer:nanoparticle:precursor weight ratio is 10:10:2.

Figure 5:
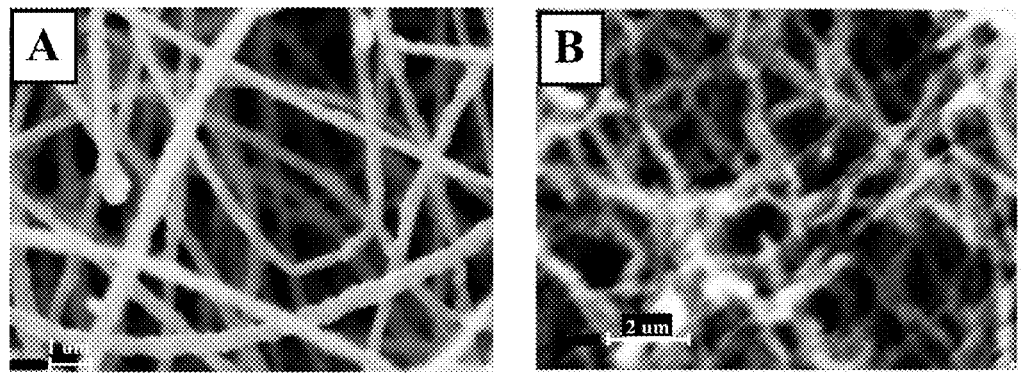
FIGS. 5A and 5B illustrates as-spun carbon precursor (CNC) and nanoparticles (Si NP) in polymer matrix nanofibers (FIG. 5A) (10:10:2, polymer:NP:carbon precursor) and thermally treated nanofibers (FIG. 5B) therefrom.

The fluid stock is electrospun according to a process of Example 2. FIGS. 5A, 5B illustrates as-spun nanofibers (FIG. 5A) and thermally treated (at 900° C. for 5 hours under argon) nanofibers (FIG. 5B).

Example 6B

Using a process similar to Example 1, a fluid stock is prepared using 1 g of cellulose nanocrystal (CNC) (8 nm average diameter, 100 nm average length) as the carbon precursor. In addition, 1 gram of preformed silicon nanoparticles (~50 nm average diameter) is added to the first composition. The resultant polymer:nanoparticle:precursor weight ratio is 1:1:1.

Figure 6:
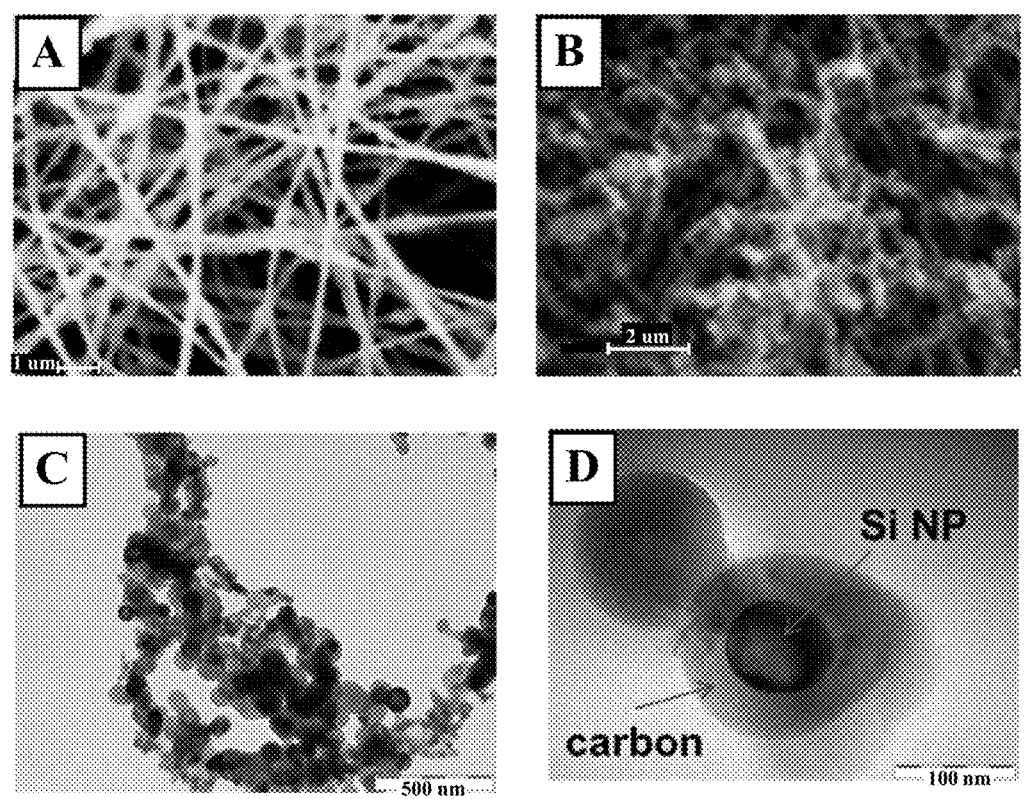
FIG. 6A illustrates as-spun carbon precursor (CNC) and nanoparticles (Si NP) in polymer matrix nanofibers (1:1:1), FIG. 6B thermally treated nanofibers therefrom, FIG. 6C surface TEM image, and FIG. 6D microtomed TEM image thereof.

The fluid stock is electrospun according to a process of Example 2. FIG. 6A illustrates as-spun carbon precursor (CNC) and nanoparticles (Si NP) in polymer matrix nanofibers (1:1:1); FIG. 6B illustrates thermally treated nanofibers therefrom; FIG. 6C shows a surface TEM image; and FIG. 6D shows a microtomed TEM image thereof.

Example 6C

Using a process similar to Example 1, a fluid stock is prepared using 0.1 g of cellulose nanocrystal (CNC) (8 nm average diameter, 100 nm average length) as the carbon precursor. In addition, 1 gram of preformed silicon nanoparticles (~50 nm average diameter) is added to the first composition. The resultant polymer:nanoparticle:precursor weight ratio is 10:10:1.

Figure 7:
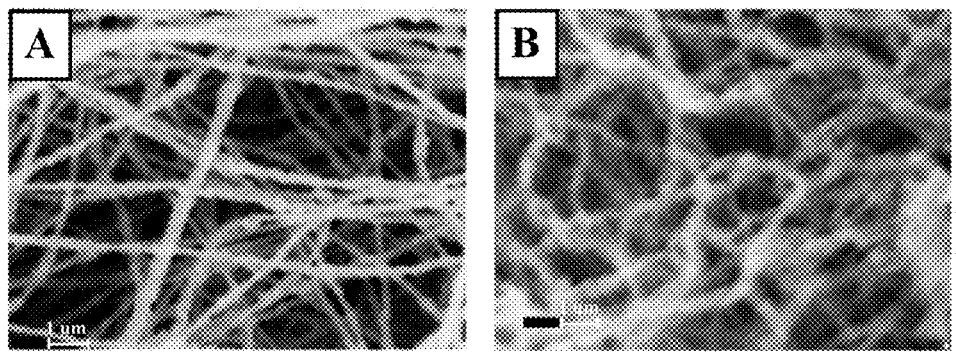
FIGS. 7A and 7B illustrates as-spun carbon precursor (CNC) and nanoparticles (Si NP) in polymer matrix nanofibers (FIG. 7A) (1:1:1) and thermally treated nanofibers (FIG. 7B) therefrom.

The fluid stock is electrospun according to a process of Example 2. FIGS. 7A, 7B illustrates as-spun nanofibers (FIG. 7A) and thermally treated (at 900° C. for 5 hours under argon) nanofibers (FIG. 7B).

Example 6D

Figure 8:
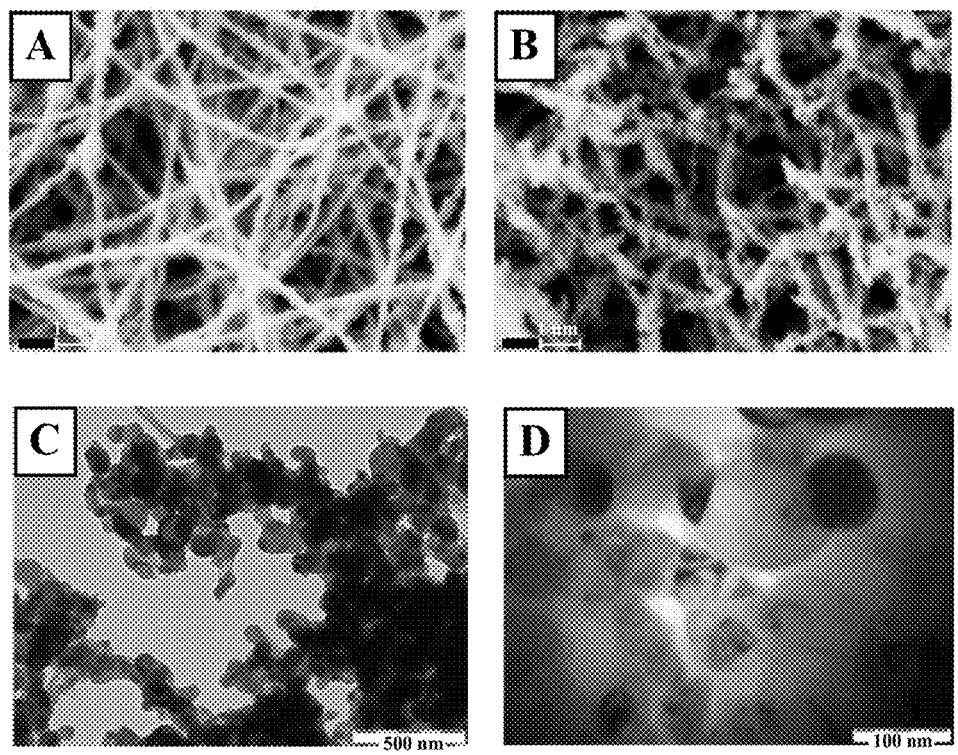
FIG. 8A illustrates as-spun nanoparticles (Si NP) in polymer matrix nanofibers (1:1), FIG. 8B thermally treated nanofibers therefrom, FIG. 8C surface TEM image, and FIG. 8D microtomed TEM image thereof.

Nanofibers are also prepared without additional carbon precursor, using PVA and Si nanoparticles in a process similar to that described in Examples 5A-5C. FIG. 8A illustrates as-spun nanoparticles (Si NP) in polymer matrix nanofibers (1:1), FIG. 8B thermally treated nanofibers therefrom, FIG. 8C surface TEM image, and FIG. 8D microtomed TEM image thereof.

Comparing FIGS. 6C, 6D and FIGS. 8C, 8D illustrate the comparison of distribution of Si NPs in carbon matrix nanofibers for those nanofibers prepared with and without carbon precursor, respectively. Si NPs are more randomly distributed in carbon nanofibers from the PVA/Si NP system, whereas Si NPs are more uniformly dispersed in carbon nanofibers from the PVA/Si/CNC systems. The microtomed TEM image of cross-section of the nanofiber in FIG. 6D, shows encapsulation of Si NP by carbon. In some instances, this configuration will reduce or prevent the Si—C hybrid/composite anode from pulverization during the lithiation/delithiation process.

Table 1 illustrates yields of nanofibers prepared herein as well as yields of similar nanofibers prepared in the absence of carbon precursor. Yield measurements are determined by the following analysis: wt. thermally treated NF/wt. prethermal treatment (i.e., spun) NF.

| 900° C. * 5 h, 2° C./m (under argon) | Constituents | | | Calcination Yield | Calcined nanofibers | |
| --- | --- | --- | --- | --- | --- | --- |
| | PVA | Si | CNC | | Si | Carbon |
| PVA | 100.0% | | | 6.5% | | 100.0% |
| CNC | | | 100.0% | 27.3% | | 100.0% |
| PVA/Si (1/1) | 50.0% | 50.0% | | 51.3% | 97.4% | 2.6% |
| PVA/Si/CNC (10/10/1) | 47.6% | 47.6% | 4.8% | 47.3% | 91.9% | 8.1% |
| PVA/Si/CNC (10/10/2) | 45.5% | 45.5% | 9.1% | 42.9% | 90.6% | 9.4% |
| PVA/Si/CNC (10/10/10) | 33.3% | 33.3% | 33.3% | 38.8% | 85.9% | 14.1% |

Table 2 illustrates cycling performance of nanofibers constructed as an anode in a lithium ion battery half cell.

TABLE 2

| Anode | Specific Capacity (mAh/g) | | |
| --- | --- | --- | --- |
| | $1^{st}$ cycle | $50^{th}$ cycle | $98^{th}$ cycle |
| Si NP | 3,310 | 22 | 13 |
| Thermally treated NF from PVA/Si (1:1) | 2,091 | 1,011 | 286 |
| Thermally treated NF from PVA/Si/CNC (1:1:1) | 2,250 | 1,253 | 814 |

Figure 10:
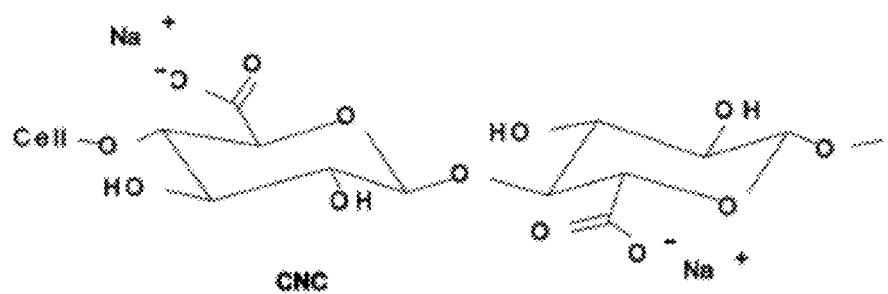
FIG. 10 illustrates a sodium form of cellulose nanocrystals.

Further, FIG. 9 illustrates discharge cyclability (0.1 C) of various nanofibers prepared from spun nanofibers with and without nanostructured carbon precursors. FIG. 10 illustrates the improved performance of anodes prepared from nanofibers prepared from spun nanofibers having nanostructured carbon precursors.

Si nanoparticles show very high initial capacity, but show drastic decrease in capacity as charge/discharge cycle. Polymer (PVA)/Si NP system shows much stable behavior than Si nanoparticles in the cycle performance. As increasing the polymer (PVA) contents, the content of carbon increases and cycle performance becomes more stable, but still shows rapid decrease in capacity. By addition of CNC, anode shows higher capacity and more stable cyclability than PVA/Si system.

Example 7

Polyvinyl alcohol (PVA) ($M_w$ 78,000) was provided from Polyscience Inc., and Si nanoparticles with the size of 20~30 nm were supplied by Nanostructured & Amorphous Materials, Inc. CNC has a Na form which is pH~7.

We dispersed CNCs in the water with concentration of 8~12%, and mixed PVA with the ratio of PVA/CNC=1/1, 5/1 and 10/1. And Si nanoparticles were added in the PVA/CNC solution to prepare PVA/Si/CNC solution. The weight ratios of PVA/Si/CNC was 10/10/10 and to prevent the aggregation of nanoparticles PVA/Si/CNC solution was sonicated for 3~5 hrs.

The prepared polymer solution was pumped into the needle for electrospinning. The distance between the nozzle and collection plate was kept to 10~20 cm, and the flow rate of 0.05~0.015. ml/min was maintained. A charge of +15 to +25 kV was maintained at the needle. However, these variables could be appropriately changed with the resin to obtain the right morphology of the fibers as well as to fine tune their properties.

SEM images of carbon precursor nanofibers show very good morphologies even at very high content of CNC. Calcined nanofibers also show good fiber morphologies.

Example 8

PVA is charged in CNC containing composition with the ratio of PVA/CNC 10/1, 10/2, 10/10 and then sonicated (e.g., for the distribution of CNC). Si nanoparticles are added in these composition to form PVA/Si/CNC (e.g., with ratios of PVA/Si=1/1, 2/1, 4/1 and 8/1). For the homogenization this composition is sonicated again for a long time to distribute all the nanoparticles well. When the composition is homogenized well, electrospinnability of these solutions is good, providing very good fiber morphologies even at very high content of CNC To make carbon/Si nanocomposite nanofibers, as-spun fibers are heat-treated under inert (e.g., argon) gas (e.g., at around 900 C), providing nanofibers with good fiber morphologies. The theoretical calcination yield of PVA is 54.5%, but experimental yield is just 5~7% at 900 C under argon. CNC of sodium form shows low theoretical calcination yield of 36.4%, but experimental yield is 26~28% at the same condition.

The obtained carbon/Si nanocomposite nanofibers are mixed with conductor (Super P) and binder (PVDF), and then changed to slurry with the help of solvent (NMP). This slurry is coated on the copper foil and then dried in the vacuum oven. To calculate the precise weight of activated materials, the weight of copper foil is checked before and after coating. Dried anode is assembled into coin type half cell with lithium metal foil as a cathode. Cell performance is tested with the half cell.

We claim:

1. A process for preparing a nanofiber, the process comprising:
   providing a fluid stock comprising (i) a polymer, and (ii) a carbon component, the carbon component being graphene and not carbon nanotubes, the graphene and polymer being present in a graphene-to-polymer weight ratio being at least 1:10;
   electrospinning the fluid stock, producing a composite comprising polymer and graphene; and
   thermally treating the composite, producing a nanofiber comprising graphene,
   wherein the graphene of the fluid stock and/or nanofiber are optionally functionalized.

2. The process of claim 1, wherein the electrospinning is gas-assisted.

3. The process of claim 2, wherein the electrospinning is coaxially gas-assisted.

4. The process of claim 1, wherein the graphene has an aspect ratio of at least 2.

5. The process of claim 1, wherein the fluid stock further comprises a plurality of silicon nanoparticles.

6. The process of claim 1, wherein the graphene-to-polymer weight ratio is at least 1:2.

7. The process of claim 6, wherein the graphene-to-polymer weight ratio is at least 1:1.

8. The process of claim 1, wherein the graphene is functionalized with one or more carboxyl group, one or more hydroxyl group, one or more alkoxyl group, or a combination thereof.

* * * * *